(12) United States Patent
Sugita et al.

(10) Patent No.: US 11,364,467 B2
(45) Date of Patent: Jun. 21, 2022

(54) DESULFURIZATION DEVICE

(71) Applicant: MITSUBISHI HITACHI POWER SYSTEMS, LTD., Yokohama (JP)

(72) Inventors: Satoru Sugita, Yokohama (JP); Tetsu Ushiku, Yokohama (JP); Ryozo Sasaki, Yokohama (JP); Naoyuki Yoshizumi, Yokohama (JP); Tsuyoshi Miyachi, Yokohama (JP); Seiji Kagawa, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 310 days.

(21) Appl. No.: 16/603,931

(22) PCT Filed: Sep. 18, 2018

(86) PCT No.: PCT/JP2018/034496
§ 371 (c)(1),
(2) Date: Oct. 9, 2019

(87) PCT Pub. No.: WO2019/059181
PCT Pub. Date: Mar. 28, 2019

(65) Prior Publication Data
US 2020/0061533 A1    Feb. 27, 2020

(30) Foreign Application Priority Data

Sep. 20, 2017    (JP) .............................. JP2017-180339

(51) Int. Cl.
*B01D 53/50*    (2006.01)
*B01D 53/78*    (2006.01)
(Continued)

(52) U.S. Cl.
CPC ......... *B01D 53/504* (2013.01); *B01D 53/505* (2013.01); *B01D 53/78* (2013.01);
(Continued)

(58) Field of Classification Search
CPC ............ B01D 2247/04; B01D 2247/08; B01D 2247/107; B01D 2251/404;
(Continued)

(56) References Cited

U.S. PATENT DOCUMENTS 5,271,873 A    12/1993    Nelson et al.
6,550,751 B1    4/2003    Brown et al.
(Continued)

FOREIGN PATENT DOCUMENTS

CA    2096702 C    6/1998
CN    102151471 A    8/2011
(Continued)

OTHER PUBLICATIONS

Office Action dated May 26, 2021, issued in counterpart CN application No. 201880025253.0, with English translation. (17 pages).
(Continued)

*Primary Examiner* — Cabrena Holecek
(74) *Attorney, Agent, or Firm* — Westerman, Hattori, Daniels & Adrian, LLP

(57) ABSTRACT

Provided is a desulfurization device that allows for the easy and accurate disposition of a spray pipe inside an absorption tower. Provided is a desulfurization device including: an absorption tower (10); and a spray pipe (20) disposed inside the absorption tower (10). The spray pipe (20) includes: a cylindrical pipe portion (21), the leading end of which is closed; and an attachment flange (24) attached to the pipe portion (21). The absorption tower (10) includes: an opening hole (14*e*) opening toward the side; and a flange (14*a*) disposed around the opening hole (14*e*). The attachment flange (24) and the flange (14*a*) are detachably attached.

10 Claims, 17 Drawing Sheets

(51) Int. Cl.
    *B01D 47/06*     (2006.01)
    *B01D 53/18*     (2006.01)
(52) U.S. Cl.
    CPC .............. *B01D 47/06* (2013.01); *B01D 53/18* (2013.01); *B01D 2258/0283* (2013.01)
(58) Field of Classification Search
    CPC ...... B01D 2252/1035; B01D 2257/302; B01D 2257/304; B01D 2258/0283; B01D 47/06; B01D 53/18; B01D 53/504; B01D 53/505; B01D 53/78; B05B 1/20; F16B 5/02
    See application file for complete search history.

(56)         References Cited

U.S. PATENT DOCUMENTS 6,613,133 B2    9/2003   Piaskowski et al.
    2010/0068111 A1 3/2010   Walsh, Jr.

FOREIGN PATENT DOCUMENTS

CN      102225308 A      10/2011
    CN      202666682 U       1/2013
    CN      105169915 A      12/2015

| | | | |
|---|---|---|---|
| DE | 42 24 691 A1 | | 1/1994 |
| DE | 19 757 438 A1 | | 6/1999 |
| JP | 1-184023 A | | 7/1989 |
| JP | 1-258729 A | | 10/1989 |
| JP | 9-117635 A | | 5/1997 |
| JP | 9-225256 A | | 9/1997 |
| JP | 11-104449 A | | 4/1999 |
| JP | 11104449 A | * | 4/1999 |
| JP | 2012-005978 A | | 1/2012 |
| JP | 2012005978 A | * | 1/2012 |
| JP | 2012-179533 A | | 9/2012 |
| JP | 2012179533 A | * | 9/2012 |
| JP | 2014-149148 A | | 8/2014 |

OTHER PUBLICATIONS

Extended (Supplementary) European Search Report dated May 26, 2021, issued in counterpart EP application No. 18859520.1. (7 pages).
International Search Report dated Dec. 25, 2018, issued in counterpart Application No. PCT/JP2018/034496 (5 pages).
Written Opinion dated Dec. 25, 2018, issued in counterpart Application No. PCT/JP2018/034496, with English Translation. (13 pages).
Office Action dated Jun. 1, 2020, issued in counterpart IN Application No. 201917040608, with English translation (6 pages).

* cited by examiner

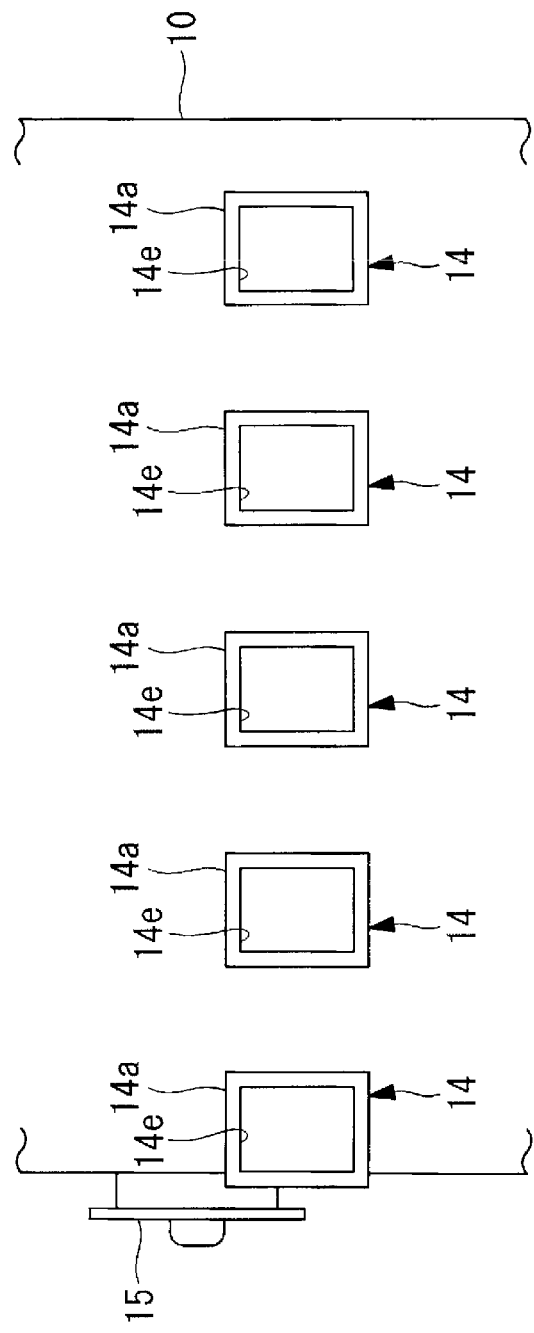

DESULFURIZATION DEVICE

TECHNICAL FIELD

The present disclosure relates to a desulfurization device including an absorption tower and a spray pipe.

BACKGROUND ART

An exhaust gas system such as a boiler installed in a power generation facility or the like is provided with a desulfurization device for removing sulfur oxide from the exhaust gas. This allows sulfur oxide contained in the exhaust gas emitted into the atmosphere to be reduced. In Patent Document 1 and Patent Document 2, disclosed is a liquid column type desulfurization device in which an liquid absorbent is injected upward from a plurality of nozzles provided in a spray pipe (branch pipe, header) installed horizontally, and a chemical reaction between a combustion exhaust gas and the liquid absorbent causes sulfur oxide in the combustion exhaust gas to be removed.

In the liquid column type desulfurization device, a reaction force directed downward is applied to the spray pipe as the liquid absorbent is injected upward. A downward impactive force is also applied to the spray pipe when the upward injected liquid absorbent drops into contact with the spray pipe. Therefore, the spray pipe is needed to be installed in the absorption tower so that a breakage is not caused even if such reaction forces or impact forces applied to the spray pipe. In the liquid column type desulfurization device, in order to effectively bring the liquid absorbent into gas-liquid contact with the exhaust gas, it is necessary to inject the liquid absorbent from the nozzles of the spray pipe along a vertical direction. In particular, in a case that a liquid column height is high, if a liquid head tilts, a distribution of the gas resistance will occur and a desulfurization performance will be affected. For example, in a case that a injection angle is offset by 0.5° from the vertical direction at a liquid height of 13 m, the liquid head is displaced by 0.1 m in a lateral direction. Therefore, the spray pipe needs to be accurately installed in an inside of the absorption tower which serves as a passage for exhaust gas.

CITATION LIST

Patent Document

Patent Document 1: JP 09-225256 A
Patent Document 2: U.S. Pat. No. 6,613,133

SUMMARY OF INVENTION

Technical Problem

In Patent Document 1, a figure illustrates a spray branch pipe 5 of an absorbent slurry supply tube 4 penetrating an absorption tower 2. In order to prevent leakage of an absorption agent or exhaust gas outward from an opening hole of the absorption tower 2 through which the spray branch pipe 5 penetrates, it is necessary to join the opening hole and the spray branch pipe 5 by welding or to fill a caulking material between the opening hole and the spray branch pipe 5.

In Patent Document 2, a figure illustrates branch pipes (headers) 14 and 15 penetrate a shell 12. In Patent Document 2, through-ports 18 and 19 are provided in the opening hole of the shell 12 through which the branch pipes 14 and 15 penetrate to eliminate a gap between the opening hole and the branch pipes 14 and 15.

However, as in Patent Document 1 and Patent Document 2, when the absorption tower and the spray pipe are fixed by welding, filling the caulking material, or the like in a portion of the opening hole, it is difficult to remove the branch pipe (spray pipe) from the absorption tower for replacement or inspection. As a result, if a failure such as damage or clogging occurs in a portion of the spray pipe, a working process for eliminating the failure is complicated and a work time is longer.

The present disclosure has been made in view of such circumstances, and has an object to provide a desulfurization device capable of easily replacing or inspecting a spray pipe in the case that a failure such as damage or clogging occurs in a portion of the spray pipe.

Solution to Problem

In order to solve the problem described above, the present disclosure adopts the following means.

A desulfurization device according to one aspect of the present disclosure includes an absorption tower serving as a passage for exhaust gas, and a spray pipe disposed inside the absorption tower, wherein the spray pipe includes a cylindrical pipe portion having a leading end closed, and a first flange portion attached to the pipe portion, the absorption tower includes an opening hole opening laterally, and a second flange portion disposed around the opening hole, and the first flange portion and the second flange portion are detachably attached.

According to the desulfurization device of one aspect of the present disclosure, the first flange portion of the spray pipe disposed inside the absorption tower and the second flange portion disposed around the opening hole of the absorption tower are detachably attached. Because the spray pipe can be easily removed from the absorption tower for replacement or inspection, it is possible to easily replace or inspect the spray pipe in the case that a failure such as damage or clogging occurs in a portion of the spray pipe.

The desulfurization device according to one aspect of the present disclosure may include a prescribed number of the spray pipes, wherein the absorption tower may include the prescribed number of the opening holes, and the prescribed number of the second flange portions, and the prescribed number of the first flange portions may be respectively attached to the prescribed number of the second flange portions in a one-to-one manner.

With such a configuration, only the spray pipe, which needs to be replaced or inspected among a prescribed number of spray pipes, can be removed from the absorption tower. For this reason, the replacement and inspection of the spray pipe can be easily performed as compared to a case that a plurality of the spray pipes are attached to one opening hole of the absorption tower. Since the opening holes of the absorption tower and the spray pipes correspond in a one-to-one manner, an installation work when installing the spray pipe in the absorption tower can be performed easily and accurately.

In the desulfurization device according to one aspect of the present disclosure, an axis line of the pipe portion may extend along a horizontal direction, and a position of the axis in a vertical direction may be disposed lower than a center position of the opening hole in the vertical direction.

With such a configuration, a sufficient space is ensured above the pipe portion when the pipe portion is installed at the opening hole, making it possible to easily install the pipe portion. Additionally, the installation work can be performed while moving the pipe portion downward along the gravity after inserting the pipe portion into the opening hole, facilitating the installation work of the pipe portion and improving an installation precision.

In the desulfurization device according to one aspect of the present disclosure, the pipe portion may be disposed in a state where a lower end portion of the pipe portion does not contact the opening hole.

With such a configuration, a failure caused by the contact between the pipe portion and the opening hole can be prevented.

In the desulfurization device according to one aspect of the present disclosure, the spray pipe may include a leg portion attached to a lower portion of the pipe portion in the vertical direction, and a position of a lower end of the leg portion in the vertical direction may be disposed lower than a position of a lower end of the opening hole in the vertical direction.

With such a configuration, the installation work can be performed while moving the leg portion downward along the gravity, the leg portion being lifted upward in the opening hole when being passed through the opening hole of the absorption tower. Therefore, the installation work when installing the leg portions of the spray pipe on the supporting portions provided in the absorption tower can be easily and accurately performed.

In the desulfurization device according to one aspect of the present disclosure, the opening hole may be rectangular. In the configuration described above, the first flange portion and the second flange portion may be rectangular in shape.

When the opening hole is rectangular, the position of the spray pipe can be changed and adjusted in a wide range in both the vertical direction and the horizontal direction. When the flanges are also rectangular in shape, the fastening portion for fastening the first flange and the second flange can be efficiently disposed around the opening hole.

In a desulfurization device according to one aspect of the present disclosure, the spray pipe may include leg portion attached to a lower portion of the pipe portion in the vertical direction and having a first surface, a plurality of nozzle holders disposed at a plurality of locations on an upper portion of the pipe portion in the vertical direction, and guiding a liquid absorbent upward in the vertical direction, the liquid absorbent flowing through the pipe portion in the horizontal direction, and a spray nozzle detachably attached to each of the plurality of nozzle holders and injecting the absorbent liquid upward in the vertical direction, the desulfurization device may include a supporting portion installed in the absorption tower to support the spray pipe and having a second surface serving as a support surface, the spray pipe may be supported in a state where the first surface faces the second surface, and a height from a lower end portion to an upper end portion of the opening hole may be higher than a height from the first surface of the leg portion to an upper end portion of the nozzle holder, in the vertical direction.

In the desulfurization device having the configuration described above, when the spray pipe is inserted into the absorption tower in a state in which the spray nozzle is not attached to each of a plurality of nozzle holders, the height of the spray pipe in the vertical direction is the height from the first surface of the leg portion to the upper end portion of the nozzle holder. Then, the height from the lower end portion to the upper end portion of the opening hole is higher than the height of the spray pipe in the vertical direction. For this reason, the spray pipe having the leg portions can be inserted from the outside to the inside of the absorption tower through the opening hole. The spray nozzle is attached to each of a plurality of nozzle holders after the spray pipe is inserted into the inside of the absorption tower, and then, the spray pipe can be put into a state capable of injecting the liquid absorbent.

In the desulfurization device according to one aspect of the present disclosure, when the absorption tower is laterally viewed, the first flange portion and the second flange portion may have a shape in which four corner portions are cut out where horizontal lines passing through an upper end and a lower end in the vertical direction intersect with vertical lines passing through a left end and a right end in the horizontal direction.

According to the desulfurization device of this configuration, when the absorption tower is laterally viewed, the first flange portion and the second flange portion have a shape in which four corner portions are cut out. For this reason, as compared to a case that four corner portions are not cut out, the working space of the worker is sufficiently ensured, making it easy to install the spray pipe.

In the desulfurization device according to one aspect of the present disclosure, when the opening is viewed from the side of the absorption tower, a center position of a left end and a right end in a horizontal direction of the first flange portion may be separate in the horizontal direction from a center position of the pipe portion.

With such a configuration, even in a case that an obstacle exists in the vicinity of the opening portion, the installation position of the pipe portion with respect to the first flange portion can be separated in the horizontal direction, and the spray pipe can be installed in the absorption tower in a state in which obstacles are avoided. Therefore, obstacles can be easily avoided in comparison with a case that obstacles are avoided by changing the position of the opening portion provided to the absorption tower.

Advantageous Effect of Invention

According to the present disclosure, it is possible to provide a desulfurization device capable of easily replacing or inspecting a spray pipe in the case that a failure such as damage or clogging occurs in a portion of the spray pipe.

BRIEF DESCRIPTION OF DRAWINGS

FIG. 17 is a side view of the absorption tower illustrated in FIG. 1.

DESCRIPTION OF EMBODIMENTS

Hereinafter, a desulfurization device 100 according to an embodiment of the present disclosure will be described with reference to the drawings.

Figure 1:
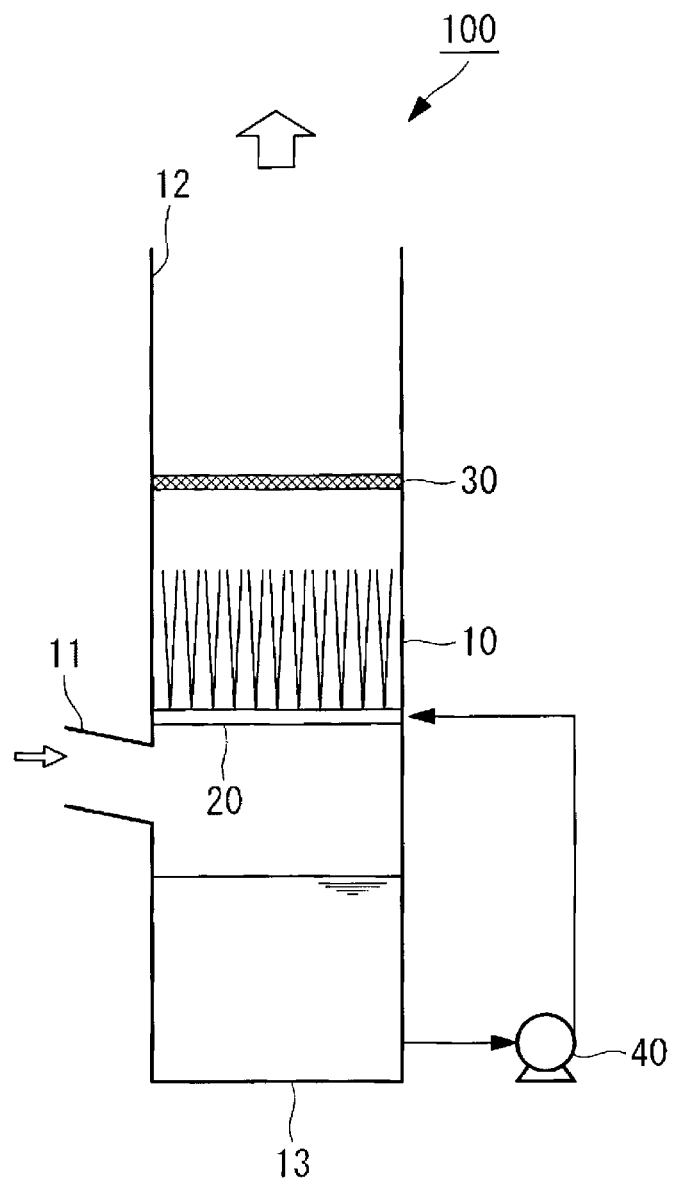
FIG. 1 is a vertical cross-sectional view illustrating a schematic configuration of a desulfurization device according to an embodiment of the present disclosure.

As illustrated in FIG. 1, the desulfurization device 100 of the present embodiment includes an absorption tower 10, a spray pipe 20, a demister 30, and a circulation pump 40.

The absorption tower 10 is a tubular casing that is formed to extend in a vertical direction and serves as a passage for exhaust gas. The absorption tower 10 directs the exhaust gas containing sulfur oxide introduced from an exhaust gas introduction section 11 formed on a side face, upward in the vertical direction. The absorption tower 10 discharges the exhaust gas, from which sulfur oxide is removed, from an exhaust gas discharge section 12 formed thereabove in the vertical direction.

The spray pipe 20 is a cylindrical member positioned inside the absorption tower 10 along a horizontal direction. As illustrated in FIG. 1, the spray pipe 20 injects a liquid absorbent upward in the vertical direction, and thereby brings the liquid absorbent into gas-liquid contact with the exhaust gas introduced from the exhaust gas introduction section 11. Here, the liquid absorbent is a liquid containing lime, and sulfur oxide contained in the exhaust gas is removed by a lime-gypsum method. The liquid absorbent injected upward in the vertical direction from the spray pipe 20 drops and accumulates in a bottom section 13 of the absorption tower 10. The liquid absorbent accumulated in the bottom section 13 is supplied to the spray pipe 20 by the circulation pump 40.

The demister 30 is, for example, a folded plate demister, and removes mist of the liquid absorbent generated inside the absorption tower 10 by physical collisions.

Next, a structure of the spray pipe 20 and the peripheral portion thereof included in the desulfurization device 100 of the present embodiment will be described in detail.

Figure 2:
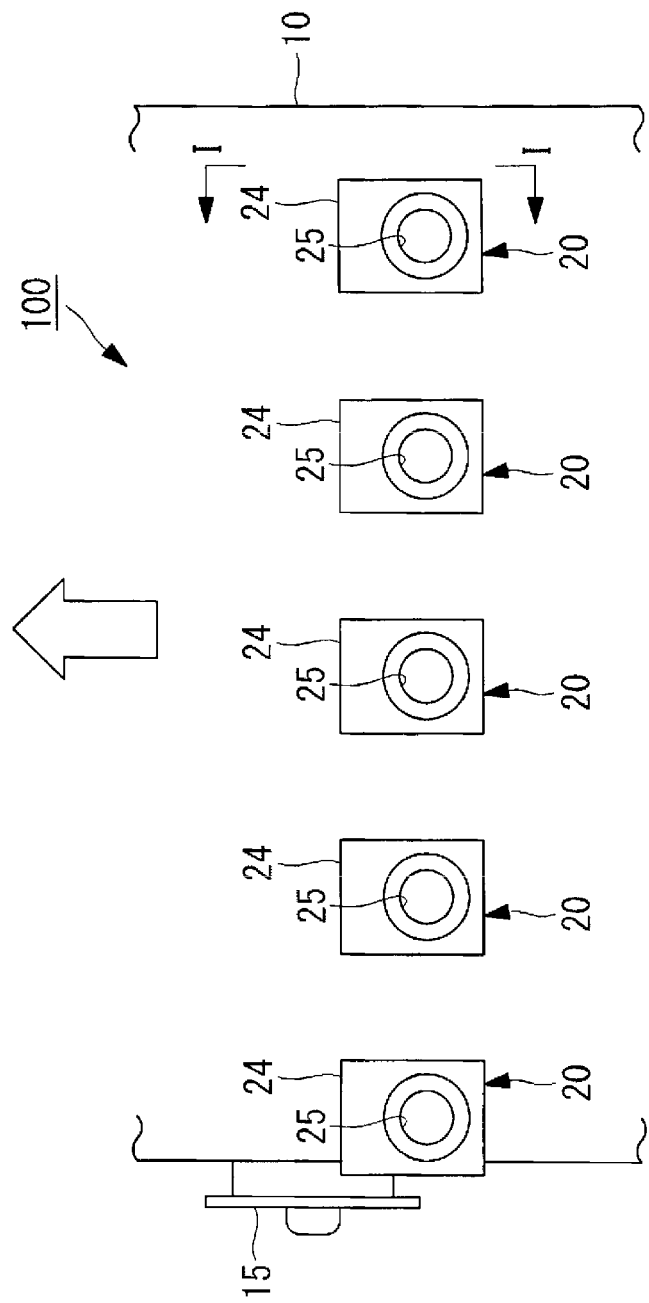
FIG. 2 is a side view of a portion including spray pipes of the desulfurization device illustrated in FIG. 1.

FIG. 2 is a side view of a potion including the spray pipes 20 of the desulfurization device 100 illustrated in FIG. 1.

As illustrated in FIG. 2, a plurality of spray pipes 20 in the desulfurization device 100 are inserted into the absorption tower 10 from the outside of the absorption tower 10. Five spray pipes 20 disposed at predetermined positions in the vertical direction are positioned in the desulfurization device 100 at equal intervals in the horizontal direction. Note that the number of the spray pipes 20 included in the desulfurization device 100 may be any number other than five depending on a size and the like of the absorption tower 10. A plurality of spray pipes 20 may be positioned in a plurality of rows at different positions in the vertical direction.

As illustrated in FIG. 2, the spray pipe 20 is provided with an attachment flange (first flange portion) 24 and a supply port 25. The attachment flange 24 is a member for attaching the spray pipe 20 to an opening portion 14 provided to the absorption tower 10 (see FIG. 4). The attachment flange 24 is attached by a plurality of fasteners (not illustrated) to an attachment flange (second flange portion) (see FIG. 12 and FIG. 17) disposed around an opening hole 14e of the opening portion 14 of the absorption tower 10.

A manhole 15 for passing through a worker is provided on a side surface of the absorption tower 10. The manhole 15 can also be used in a case that a maintenance component or the like is carried from the outside to the inside of the absorption tower 10, or in a case that a used component or the like is carried from the inside to the outside of the absorption tower 10.

Figure 3:
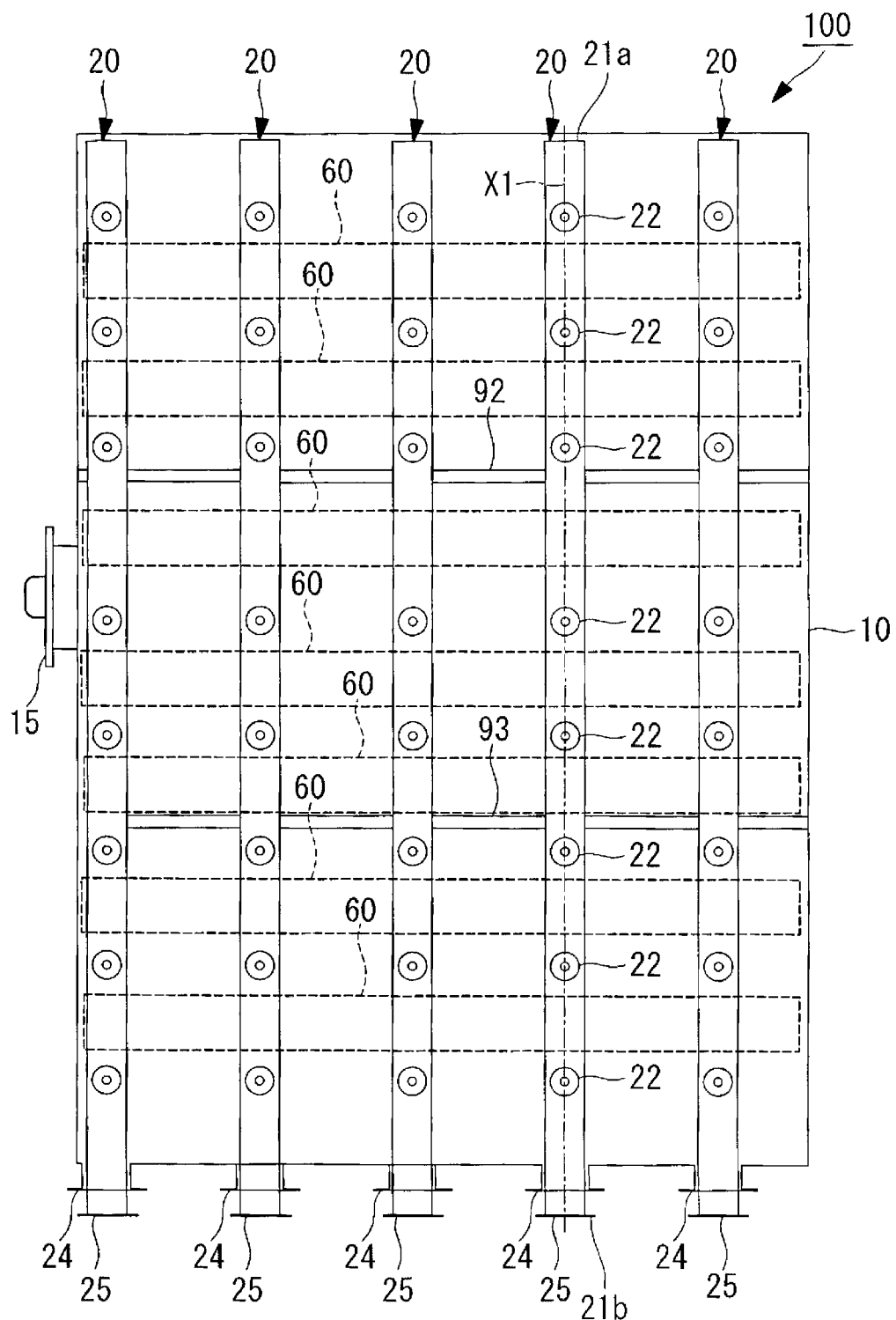
FIG. 3 is a plan view of the spray pipes illustrated in FIG. 2, viewed from above.
Figure 4:
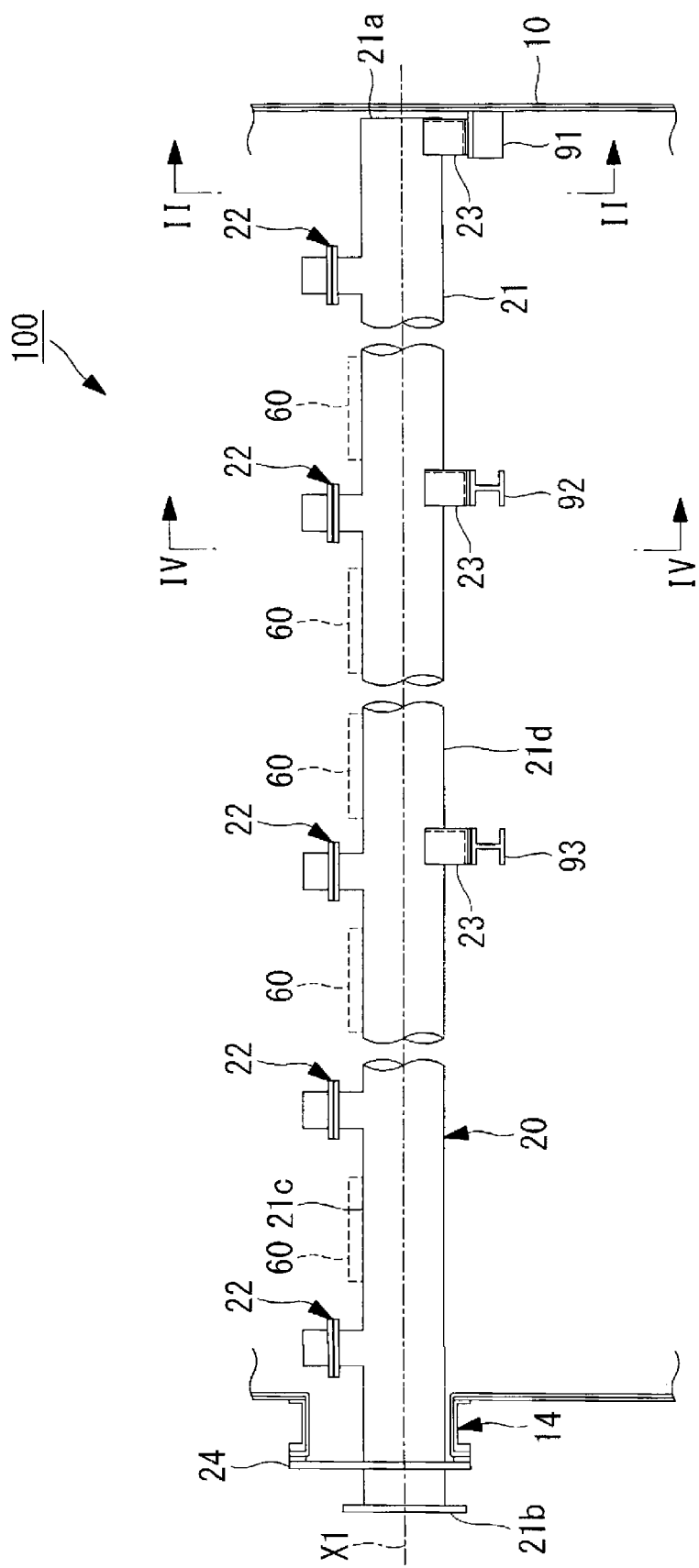
FIG. 4 illustrates a portion including the spray pipes of the desulfurization device viewed along arrows I-I in FIG. 2.

FIG. 3 is a plan view of five spray pipes 20 illustrated in FIG. 2, viewed from above. FIG. 4 illustrates a portion including the spray pipes 20 of the desulfurization device 100 viewed along arrows I-I in FIG. 2.

As illustrated in FIG. 3 and FIG. 4, the spray pipe 20 includes a pipe portion 21, a plurality of nozzle parts (nozzle holders 22b) 22, and a plurality of leg portions 23.

The pipe portion 21 is a cylindrical member extending linearly from a base end 21b to a leading end 21a along an axis line X1 in the horizontal direction, and the leading end 21a is closed. The base end 21b of the pipe portion 21 is provided with the supply port 25 to which the liquid absorbent is supplied from the circulation pump 40, and a flange 26 for coupling a liquid absorbent supply pipe 41 (see FIG. 1) is formed around the supply port 25.

Because the leading end 21a of the pipe portion 21 is closed, the liquid absorbent supplied through the supply port 25 to the inside of the pipe portion 21 is guided to the plurality of nozzle parts 22. A length from the base end 21b to the leading end 21a along the axis line X1 of the pipe portion 21 is 3 m or more and 15 m or less. An outer diameter of the pipe portion 21 is 200 mm or more and 400 mm or less.

Figure 5:
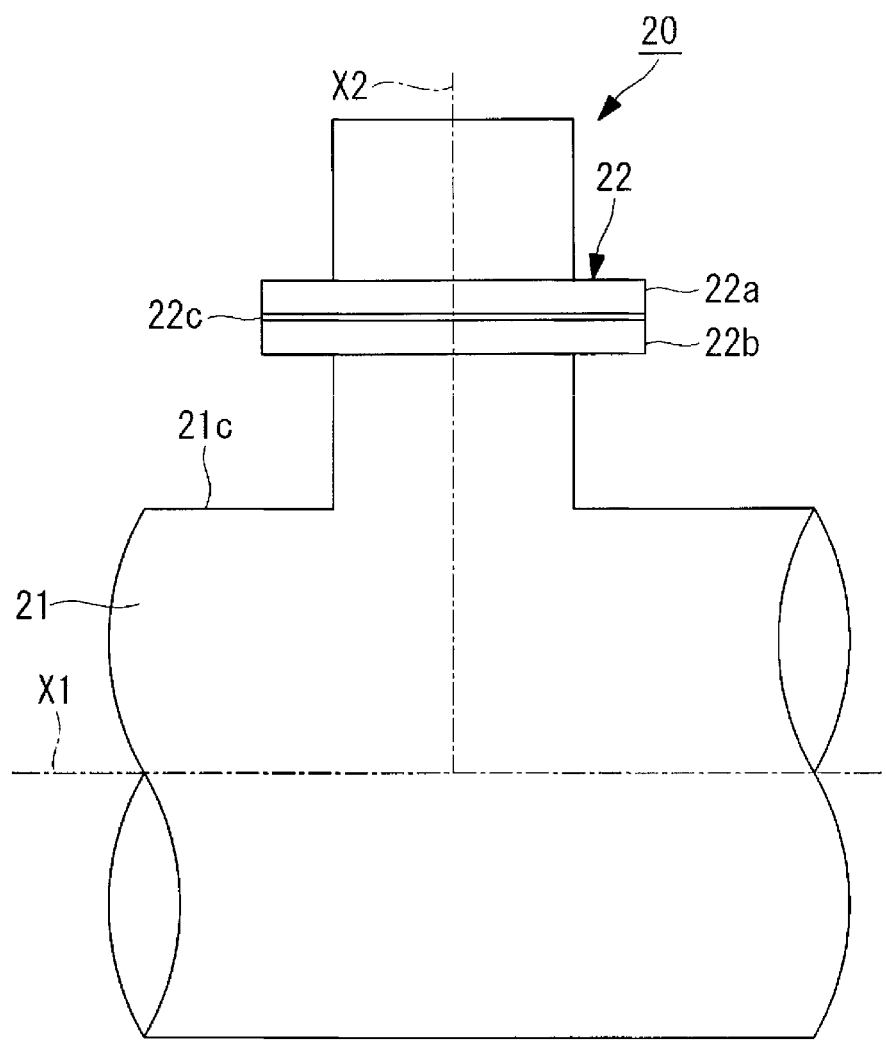
FIG. 5 is a partially enlarged view of a nozzle part illustrated in FIG. 2.

A plurality of nozzle parts 22 are members disposed at a plurality of locations on an upper end portion (upper portion) 21c in the vertical direction of the pipe portion 21 along the axis line X1 at equal intervals. Here, FIG. 5 is a partial enlarged view of the nozzle portion 22 illustrated in FIG. 2. As illustrated in FIG. 5, the nozzle portion 22 includes a spray nozzle 22a, a nozzle holder 22b, and a gasket 22c.

The spray nozzle 22a is a member that guides the liquid absorbent upward in the vertical direction along an axis line X2, the liquid absorbent flowing through the pipe portion 21 in the horizontal direction along the axis line X1. The spray nozzle 22a injects the liquid absorbent supplied from the circulation pump 40 upward in the vertical direction to bring the exhaust gas into gas-liquid contact with the liquid absorbent within the absorption tower 10. The spray nozzle 22a is detachably attached to the nozzle holder 22b and is formed, for example, from silicon carbide (SiC).

The nozzle holder 22b is a member that is disposed at each of a plurality of locations on the upper end portion 21c of the pipe portion 21 and is formed in a cylindrical shape along the axis line X2 in the vertical direction. The nozzle holder 22b guides the liquid absorbent upward in the vertical direction, the liquid absorbent flowing through the pipe portion 21 in the horizontal direction. A lower end side of the spray nozzle 22a is inserted into the nozzle holder 22b. A flange is formed on an upper end of the nozzle holder 22b.

A flange having the same shape as the flange of the nozzle holder 22b is formed on the spray nozzle 22a. As illustrated in FIG. 5, the flange of the spray nozzle 22a and the flange of the nozzle holder 22b in a state of sandwiching the circular gasket 22c (for example, made of butyl rubber) are fastened by a plurality of fasteners (not illustrated).

As illustrated in FIG. 4, a plurality of leg portions 23 are members attached to a lower end portion (lower portion) 21d of the pipe portion 21. The leg portions 23 are attached to a plurality of locations including the leading end 21a of the pipe portion 21. A plurality of leg portions 23 transmit a load of the pipe portion 21 to a pipe support (supporting portion) 91, a support beam (supporting portion) 92, and a support beam (supporting portion) 93 that are installed in the absorption tower 10. The pipe support 91, the support beam 92, and the support beam 93 are members that are installed in the absorption tower 10 to support the spray pipe 20. A reaction force when injecting the liquid absorbent and an impactive force caused by the liquid absorbent dropping and coming into contact with the pipe portion 21, which forces are applied to the pipe portion 21, are transmitted to the absorption tower 10 via a plurality of leg portions 23.

Figure 12:
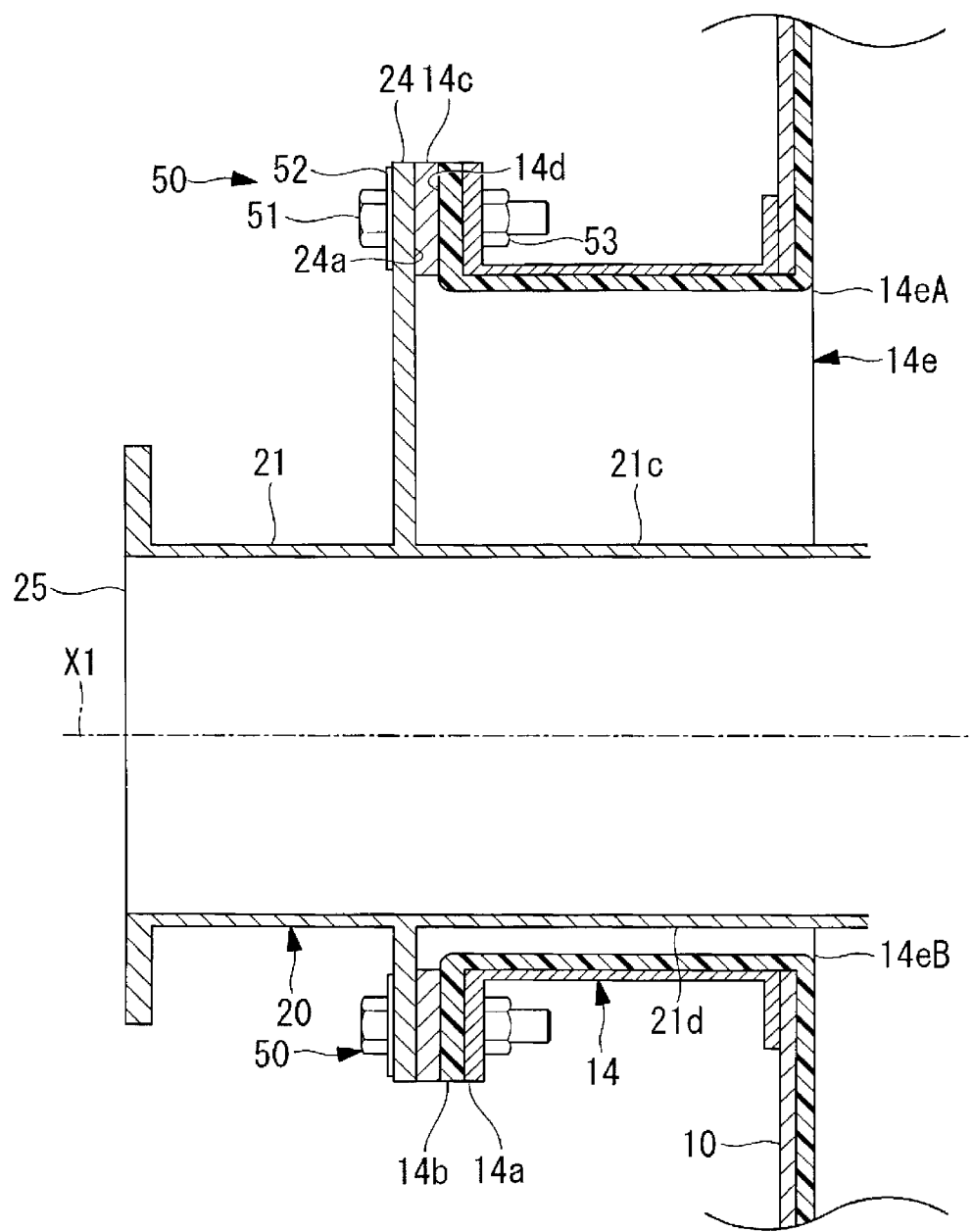
FIG. 12 is a partial enlarged view of a portion including an attachment flange of the spray pipe in the desulfurization device illustrated in FIG. 4.

As illustrated in FIG. 4, the spray pipe 20 is installed in the absorption tower 10 such that a position in the vertical direction of a lower end of the leg portion 23, in a state of being supported by the pipe support 91 and the support beams 92 and 93, is lower than a lower end in the vertical direction of the opening hole 14e of the opening portion 14 (see FIG. 12).

Here, the leg portion 23 attached to the leading end 21a of the pipe portion 21 will be described.

Figure 6:
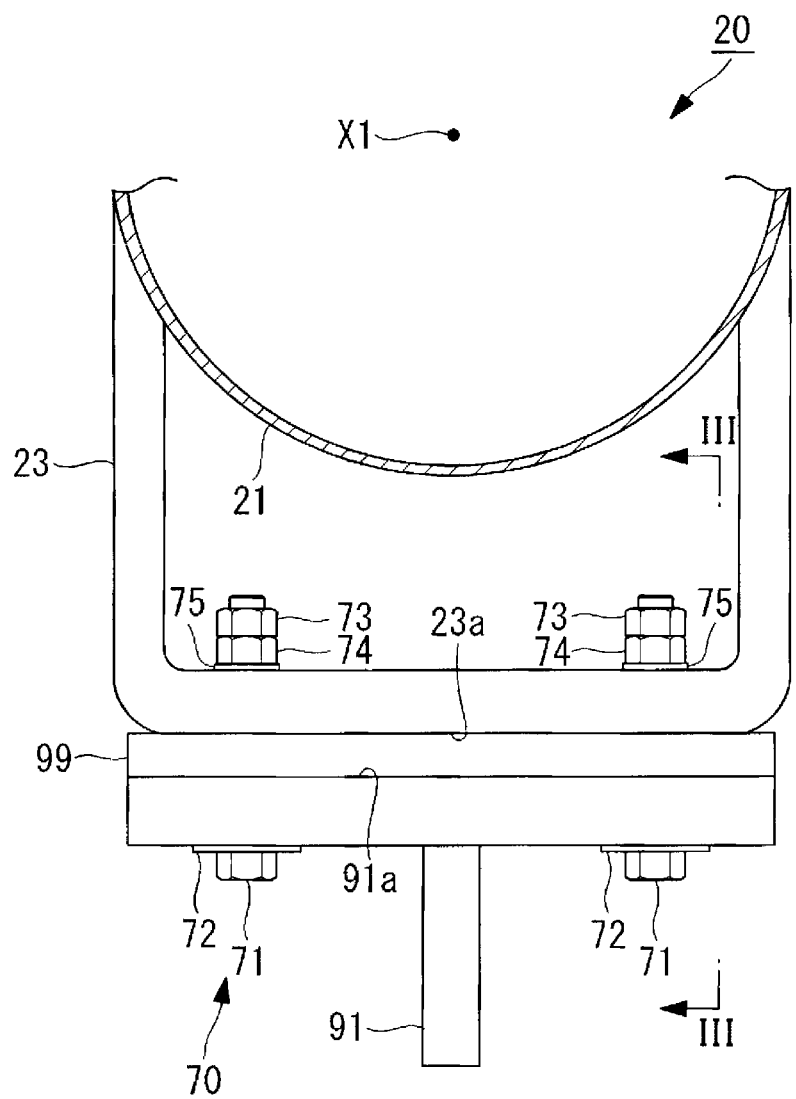
FIG. 6 illustrates a portion including the spray pipe of the desulfurization device viewed along arrows II-II in FIG. 4.
Figure 7:
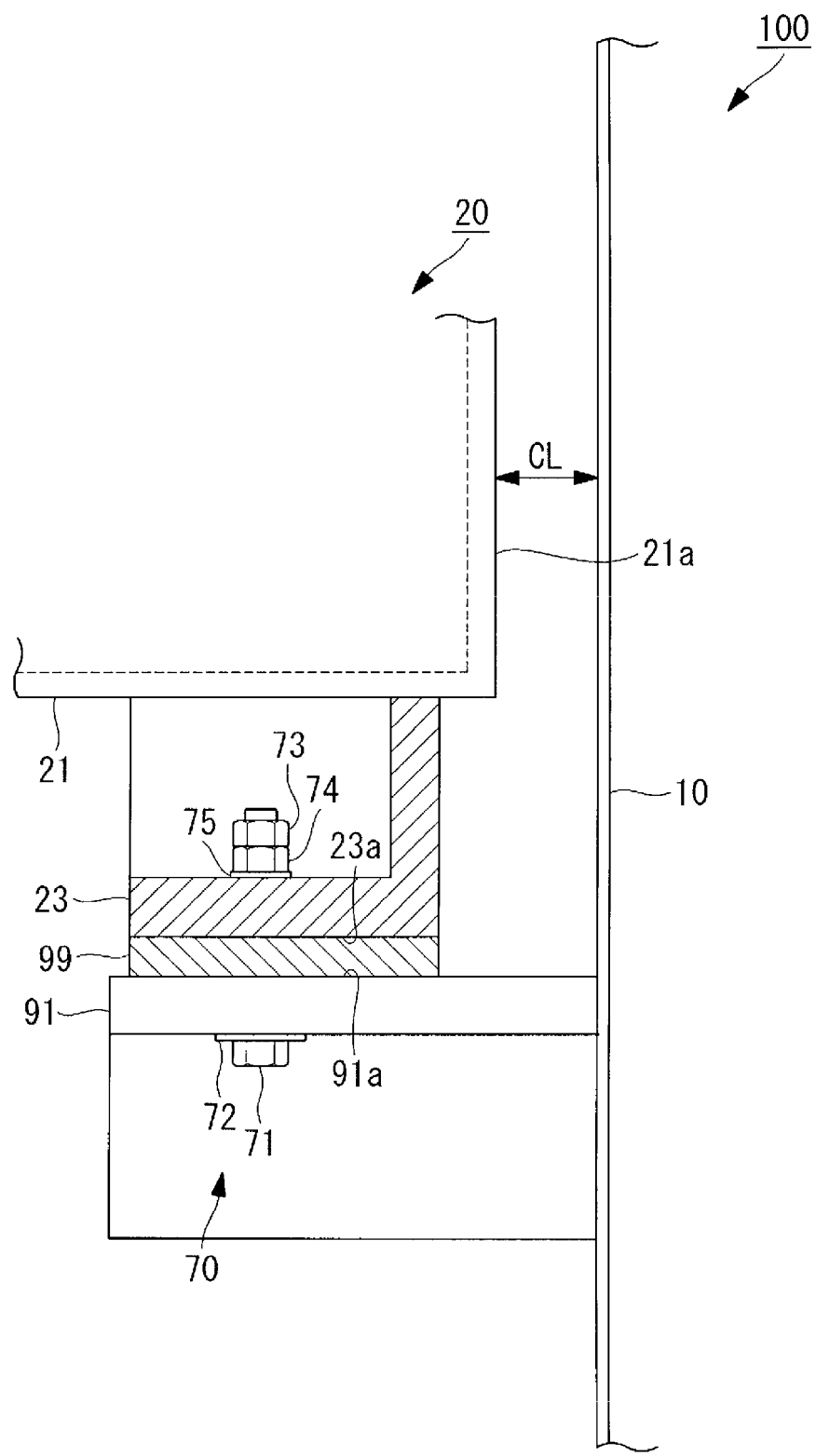
FIG. 7 illustrates a portion including the spray pipe of the desulfurization device viewed along arrows in FIG. 6.

FIG. 6 illustrates a portion including the spray pipe 20 of the desulfurization device 100 viewed along arrows II-II in FIG. 4. FIG. 7 illustrates a portion including the spray pipe 20 of the desulfurization device 100 viewed along arrows in FIG. 6. The leg portion 23 illustrated in FIG. 6 and FIG. 7 is attached to the lower end portion 21d at the leading end 21a of the pipe portion 21. As illustrated in FIG. 6, an upper end of the leg portion 23 is attached to the pipe portion 21. The leg portion 23 includes an installation surface (first surface) 23a at the lower end thereof. The installation surface 23a is a flat installation surface along a horizontal plane, but may be another aspect. For example, the installation surface 23a may have a polygonal shape or an arc shape in a cross section orthogonal to the axis line X1.

As illustrated in FIG. 7, the pipe support 91 formed of a metal material or the like is installed on an inner wall surface of the absorption tower 10. The pipe support 91 has a supporting surface (second surface) 91a supporting the spray pipe 20 on an upper end thereof. The supporting surface 91a is a flat installation surface along a horizontal plane, but may be another aspect. For example, the supporting surface 91a may have a polygonal shape or an arc shape in a cross section orthogonal to the axis line X1. The upper surface of the supporting surface 91a may be coated with a resin lining to protect the supporting surface 91a from corrosion or the like.

As illustrated in FIG. 6 and FIG. 7, a shim plate (plate-shaped member) 99 is disposed between the installation surface 23a of the lower end of the leg portion 23 and the supporting surface 91a of the upper end of the pipe support 91.

As illustrated in FIG. 6 and FIG. 7, the leg portion 23 is disposed in a state where the installation surface 23a faces the supporting surface 91a. In other words, the spray pipe 20 is supported by the pipe support 91 in a state where the installation surface 23a faces the supporting surface 91a.

Thus, a rotation direction angle of the pipe portion 21 about an axial center is to be determined with reference to the supporting surface 91a.

The leg portion 23 is attached to the pipe portion 21 such that the axial center of the spray nozzle 22a attached to the pipe portion 21 (nozzle holder 22b) is at a rotation direction angle along the vertical direction when the installation surface 23a of the leg portion 23 faces the supporting surface 91a, which eliminates time and effort of adjusting the rotation direction angle of the pipe portion 21 in installing the spray pipe 20 in the absorption tower 10. Furthermore, since the pipe portion 21 is supported by a "surface" of the pipe support 91 via the leg portion attached to the pipe portion 21, as compared with a case that the pipe portion 21 is supported directly by the pipe support without providing the leg portion to the pipe portion, for example, a local stress applied to a part of the pipe portion 21 contacting the pipe support 91 can be lowered and such a possibility can be reduced that an injection direction of the liquid absorbent does not follow the vertical direction which is caused by that the pipe portion 21 receives a reaction force associated with the liquid absorbent being injected or an impactive force caused by the liquid absorbent dropping and the rotation direction angle of the pipe portion 21 is shifted.

Note that the shim plate 99 is a member that adjusts a position of the installation surface 23a in the vertical direction with respect to the supporting surface 91a in order to install the pipe portion 21 along the horizontal direction. In FIG. 6 and FIG. 7, although the shim plate 99 is disposed between the installation surface 23a and the supporting surface 91a, the shim plate 99 may not be disposed if the shim plate 99 is not needed for installing the pipe portion 21 along the horizontal direction. In this case, the installation surface 23a and the supporting surface 91a are disposed in a state of direct contact therebetween. The shim plate 99 having a thickness appropriate in the vertical direction may be used to install the pipe portion 21 along the horizontal direction. A plurality of shim plates 99 may be disposed in a stacked manner.

As illustrated in FIG. 6 and FIG. 7, the leg portion 23, the pipe support 91, and the shim plate 99 are fastened by a fastening portion (second fastening portion) 70. The fastening portion 70 includes a fastening bolt 71 having a head and a shank, a washer 72 disposed between the head of the fastening bolt 71 and the pipe support 91, fastening nuts 73 and 74 fastened on the shank of the fastening bolt 71, and a washer 75 disposed between the fastening nut 74 and the leg portion 23.

Fastening two fastening nuts 73 and 74 on the shank of the fastening bolt 71 is to allow a clearance gap to be provided below the fastening nut 74. In a case that a clearance gap is not provided below the fastening nut 74, the leg portion 23, the pipe support 91, and the shim plate 99 are advantageously rigidly connected. On the other hand, if the leg portion 23, the pipe support 91, and the shim plate 99 are rigidly connected, deformation and breakage may occur in a fastened portion when the pipe portion 21 deforms due to thermal expansion.

In the present embodiment, the fastening nut 73 and the fastening nut 74 can be in a fastening state in which the fastening nut 73 and the fastening nut 74 do not move in the vertical direction, by tightening the fastening nut 73 in a state that a clearance gap is provided below the fastening nut 74, or by tightening the fastening nut 74 and thereafter tightening the fastening nut 73, and further loosening fastening nut 74. In this case, even in the case that the pipe portion 21 deforms due to thermal expansion, failures caused by the deformation and breakage occurring in the fastened portion can be suppressed.

Next, the leg portion 23 attached to an intermediate portion between the leading end 21a and the base end portion 21b of the pipe portion 21 will be described.

Figure 8:
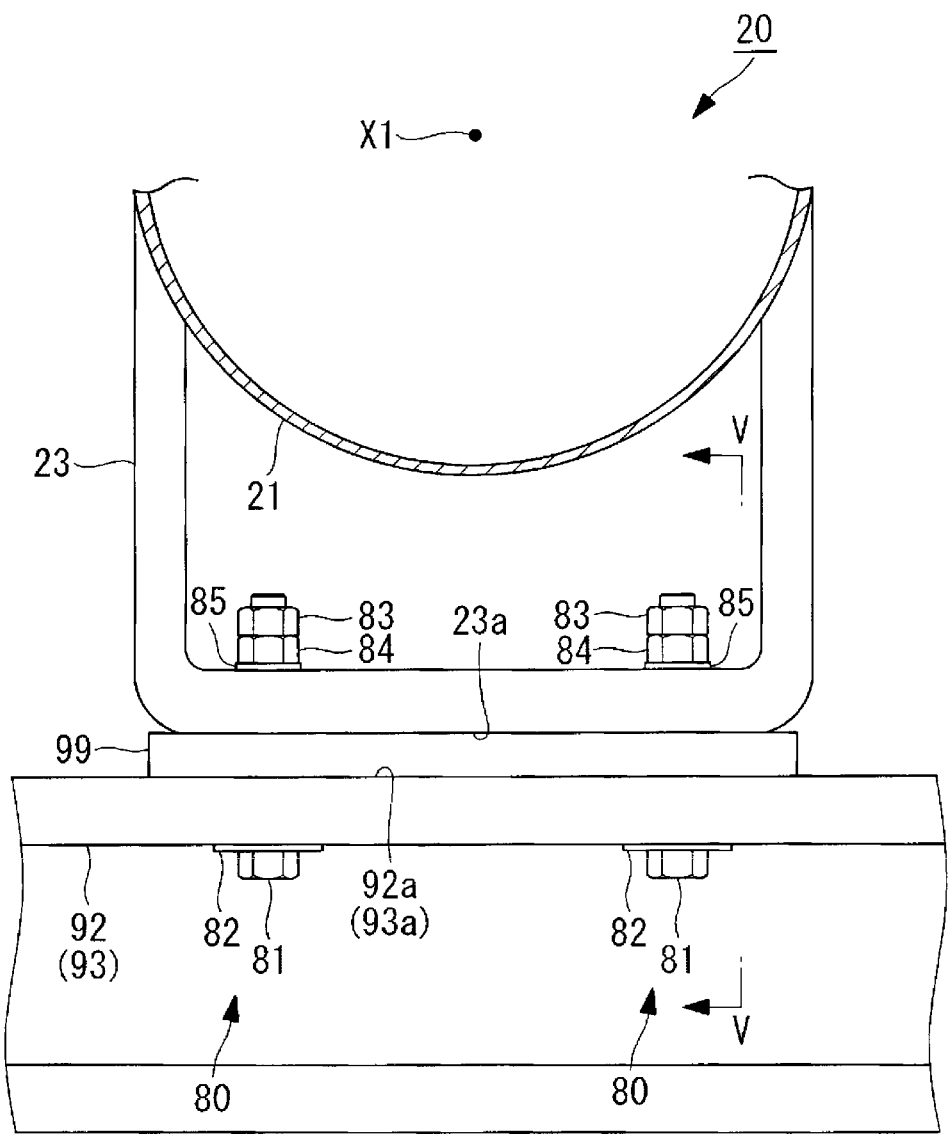
FIG. 8 illustrates a portion including the spray pipe of the desulfurization device viewed along arrows IV-IV in FIG. 4.
Figure 9:
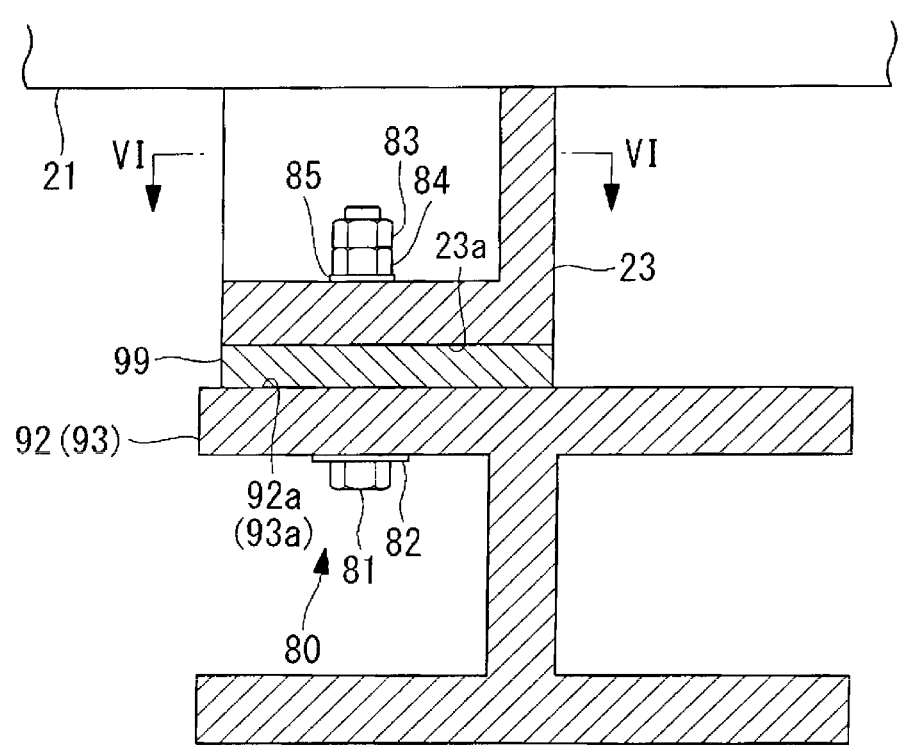
FIG. 9 illustrates a portion including the spray pipe of the desulfurization device viewed along arrows V-V in FIG. 8.

FIG. 8 illustrates a portion including the spray pipe 20 of the desulfurization device 100 viewed along arrows IV-IV in FIG. 4. FIG. 9 illustrates a portion including the spray pipe 20 of the desulfurization device 100 viewed along arrows V-V in FIG. 8. The leg portion 23 illustrated in FIG. 8 and FIG. 9 is attached to the intermediate portion between the leading end 21a and the base end 21b of the pipe portion 21. As illustrated in FIG. 8, an upper end of the leg portion 23 is attached to the pipe portion 21. The leg portion 23 has an installation surface (first surface) 23a at a lower end thereof. The installation surface 23a is a flat installation surface along a horizontal plane, but may be another aspect. For example, the installation surface 23a may have a polygonal shape or an arc shape in a cross section orthogonal to the axis line X1.

As illustrated in FIG. 3 and FIG. 8, a support beam 92 and a support beam 93 that are formed of a metal material or the like and extend in the horizontal direction are installed in the absorption tower 10. The support beam 92 has a supporting surface (second surface) 92a on an upper end thereof. Similarly, the support beam 93 has a supporting surface (second surface) 93a at an upper end thereof.

Each of the supporting surfaces 92a and 93a is a flat installation surface along a horizontal plane, but may be another aspect. For example, each of the supporting surface 92a and the supporting surface 93a may have a polygonal shape or an arc shape in a cross section orthogonal to the axis line X1. The upper surface of each of the supporting surface 92a and the supporting surface 93a may be coated with a resin lining to protect the supporting surface 92a and the supporting surface 93a, respectively, from corrosion or the like.

As illustrated in FIG. 8 and FIG. 9, a shim plate 99 is disposed between the installation surface 23a of the lower end of the leg portion 23 and the supporting surface 92a of the upper end of the support beam 92 or the supporting surface 93a of the upper end of the support beam 93.

As illustrated in FIG. 8 and FIG. 9, the leg portion 23 is disposed in a state where the installation surface 23a faces the supporting surfaces 92a, 93a. The spray pipe 20 is supported by the support beams 92 and 93 in a state where the installation surface 23a faces the supporting surfaces 92a and 93a.

Thus, the rotation direction angle of the pipe portion 21 about the axial center is to be determined with reference to the supporting surfaces 92a and 93a. The leg portion 23 is attached to the pipe portion 21 such that the axial center of the spray nozzle 22a attached to the pipe portion 21 (nozzle holder 22b) is at a rotation direction angle along the vertical direction when the installation surface 23a of the leg portion 23 faces the supporting surfaces 92a and 93a, which eliminates time and effort of adjusting the rotation direction angle of the pipe portion 21 in installing the spray pipe 20 in the absorption tower 10. Furthermore, since the pipe portion 21 is supported by a "surface" of each of the support beams 92 and 93 via the leg portion attached to the pipe portion 21, as compared with a case that the pipe portion 21 is supported directly by each of the support beams 92 and 93 without providing the leg portion to the pipe portion, for example, a local stress applied to a part of the pipe portion 21 contacting each of the support beams 92 and 93 can be lowered and such a possibility can be reduced that an injection direction of the liquid absorbent does not follow the vertical direction which is caused by that the pipe portion 21 receives a reaction force associated with the liquid absorbent being injected or an impactive force caused by the liquid absorbent dropping and the rotation direction angle of the pipe portion 21 is shifted.

Note that the shim plate 99 is a member that adjusts a position of the installation surface 23a in the vertical direction with respect to each of the supporting surfaces 92a and 93a in order to install the pipe portion 21 along the horizontal direction. In FIG. 8 and FIG. 9, although the shim plate 99 is disposed between the installation surface 23a and the supporting surface 92a or 93a, the shim plate 99 may not be disposed if the shim plate 99 is not needed for installing the pipe portion 21 along the horizontal direction. In this case, the installation surface 23a and the supporting surfaces 92a, 93a are disposed in a state of direct contact therebetween. The shim plate 99 having a thickness appropriate in the vertical direction may be used to install the pipe portion 21 along the horizontal direction. A plurality of shim plates 99 may be disposed in a stacked manner.

As illustrated in FIG. 8 and FIG. 9, the leg portion 23, the support beams 92, 93, and the shim plate 99 are fastened by a fastening portion (second fastening portion) 80. The fastening portion 80 includes a fastening bolt 81 having a head and a shank, a washer 82 disposed between the head of the fastening bolt 81 and the support beams 92, 93, fastening nuts 83 and 84 fastened on the shank of the fastening bolt 81, and a washer 85 disposed between the fastening nut 84 and the leg portion 23. Note that fastening two fastening nuts 83 and 84 on the shank of the fastening bolt 81 is to allow a clearance gap to be provided below the fastening nut 84.

Here, a method of manufacturing the spray pipe 20 will be described. The spray pipe 20 of the present embodiment is obtained by forming the pipe portion 21, the nozzle holders 22b of the nozzle parts 22, and the leg portions 23 into one body from a Fiber-Reinforced Plastic. On the other hand, the spray nozzle 22a attached to the nozzle holder 22b is formed of silicon carbide (SiC), for example.

The spray pipe 20 of the present embodiment is manufactured by forming the pipe portion 21, the nozzle holders 22b of the nozzle parts 22, and the leg portions 23 into one body from the fiber-reinforced plastic. The spray pipe 20 is likely to cause abrasion by collision of the liquid absorbent that is injected upward and drops. In the present embodiment, since the fiber-reinforced plastic is used for the spray pipe 20, resistance to wear is high. Furthermore, resistance to corrosion is also high.

Note that a metal material (for example, UNS S31254 or Hastelloy C-276) in place of the fiber-reinforced plastic may be used as the material for forming the spray pipe 20. In a case of a desulfurization device for an oil burning boiler, 316 L or the like may be used. When the spray pipe 20 is made of a metal, the leg portion 23 may be separately made of a metal material and attached to the spray pipe 20 by welding or screw joining.

Note that the leg portion 23 is preferably a rigid body. This is because by rigidly supporting the spray pipe 20, an inclination in the horizontal direction and a rotation in a cross-sectional direction can be suppressed, and the liquid absorbent can be accurately injected in the vertical direction.

Next, an insertion hole 23b formed in the leg portion 23 will be described.

Figure 10:
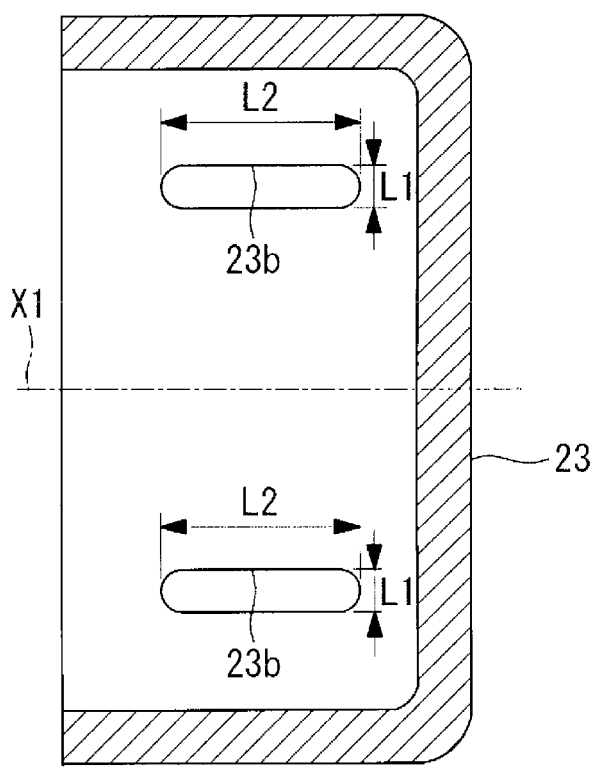
FIG. 10 is a cross-sectional view of a leg portion viewed along arrows VI-VI in FIG. 9.

FIG. 10 is a cross-sectional view of the leg portion 23 viewed along arrows VI-VI in FIG. 9. As illustrated in FIG. 10, the insertion hole 23b into which the fastening bolt 81 is inserted is formed in the installation surface 23a of the leg portion 23. The insertion hole 23b has a length L2 in a direction along the axis line X1 that is longer than a length L1 in a direction orthogonal to the axis line X1. The insertion hole 23b is a long hole in order to suppress failures that the insertion hole 23b contacts the fastening bolt 81 when the leg portion 23 moves toward the leading end 21a of the pipe portion 21 by the spray pipe 20 thermally stretching.

Note that in the present embodiment, the insertion hole 23b provided on the installation surface 23a of the leg portion 23 is a long hole, and the insertion hole (not illustrated) provided to the pipe support 91 and the support beams 92, 93 is a circular round hole, but other aspects may be used. For example, the insertion hole 23b provided on the installation surface 23a of the leg portion 23 may be a circular round hole, and the insertion hole (not illustrated) provided to the pipe support 91 and the support beams 92, 93 may be a long hole having a length L2 in a direction along the axis line X1 that is longer than a length L1 in a direction orthogonal to the axis line X1. Alternatively, both the insertion hole 23b provided on the installation surface 23a of the leg portion 23 and the insertion hole provided to the pipe support 91 and the support beams 92, 93 may be a long hole.

Next, a cutout 99a formed on the shim plate 99 will be described.

Figure 11:
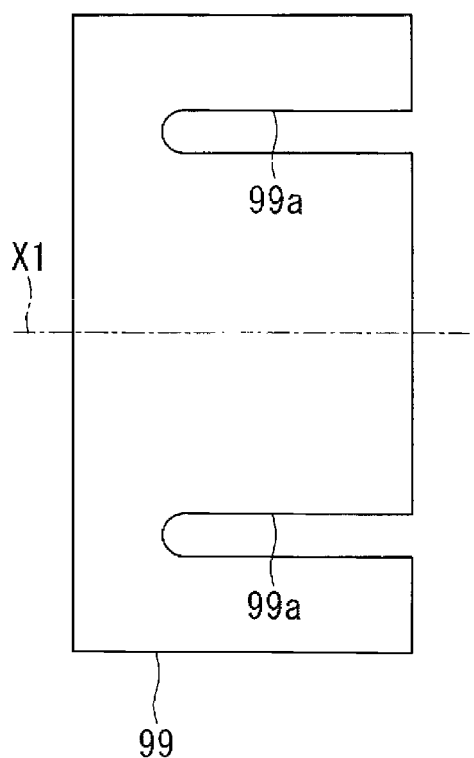
FIG. 11 illustrates a plate-shaped member viewed along arrows VI-VI in FIG. 9.

FIG. 11 illustrates a plate-shaped member viewed along arrows VI-VI in FIG. 9. As illustrated in FIG. 11, the cutout 99a that opens toward one end is formed on the shim plate 99. The cutout 99a is a portion into which the fastening bolt 81 can be inserted in a state in which the cutout 99a is between the installation surface 23a of the leg portion 23 and the supporting surfaces 92a, 93a of the support beams 92, 93. The cutout 99a is a portion into which the fastening bolt 71 can be inserted in a state in which the cutout 99a is between the installation surface 23a of the leg portion 23 and the supporting surface 91a of the pipe support 91 (see FIG. 7).

Since the shim plate 99 includes the cutout 99a, the shim plate 99 can be inserted between the installation surface 23a of the leg portion 23 and the supporting surface 91a of the pipe support 91 without removing the fastening bolt 71. Similarly, since the shim plate 99 includes the cutout 99a, the shim plate 99 can be inserted between the installation surface 23a of the leg portion 23 and the supporting surfaces 92a and 93a of the support beams 92 and 93 without removing the fastening bolt 81. In this manner, when installing the leg portion 23 provided to the spray pipe 20 into the pipe support 91 and the support beams 92 and 93, the shim plate 99 is installed at a suitable location so that the spray pipe 20 can be adjusted to be positioned in the horizontal direction.

Note that the shim plate 99 is disposed in a state where the cutout 99a is open toward the leading end 21a of the pipe portion 21 along the axis line X1. Specifically, the cutout 99a of the shim plate 99 is not open toward the base end 21b side of the pipe portion 21. Thus, even when a force directed to the leading end 21a is applied to the shim plate 99 from the leg portion 23, the shim plate 99 which is brought into contact with the fastening bolts 71, 81 does not move toward the leading end 21a. Therefore, failures that the shim plate 99 moves toward the leading end 21a to drop out of the pipe support 91 and the support beams 92, 93 can be prevented.

Next, a clearance CL formed between the leading end 21a of the pipe portion 21 of the spray pipe 20 and the inner wall surface of the absorption tower 10 will be described.

As illustrated in FIG. 7, a clearance CL is defined between the leading end 21a of the pipe portion 21 and the inner wall surface of the absorption tower 10. This clearance CL is an interval required for the leading end 21a of the pipe portion 21 to not contact the inner wall surface of the absorption tower 10. Note that the spray pipe 20 is thermally expanded by high-temperature exhaust gas. Therefore, the pipe portion 21 of the present embodiment is arranged so that the clearance CL can be ensured even in a state in which the spray pipe 20 is heated by the exhaust gas. In other words, the pipe portion 21 is installed in a state in which the spray pipe 20 is installed (the same state as at the atmospheric temperature) so that the clearance CL can be ensured even when thermal stretching occurs. In the present embodiment, in a state of not being heated by the exhaust gas, the clearance CL between the leading end 21a of the pipe portion 21 and the inner wall surface of the absorption tower 10 is 10 mm or more and 100 mm or less.

Next, a structure in which the attachment flange 24 (first flange portion) of the spray pipe 20 is attached to the opening portion 14 of the absorption tower 10 will be described.

FIG. 12 is a partial enlarged view of a portion including the attachment flange 24 of the spray pipe 20 in the desulfurization device 100 illustrated in FIG. 4. As illustrated in FIG. 12, the opening portion 14 of the absorption tower 10 is formed in a cylindrical shape to be open toward the side of the absorption tower 10 and extend along the axis line X1. The opening portion 14 has an opening hole 14e that opens laterally. A flange (second flange portion) 14a disposed around the opening hole 14e is formed at an end of the opening portion 14. A lining portion 14b made of resin for protecting the flange 14a from corrosion due to the exhaust gas or the like is provided on an inner circumferential surface of the flange 14a.

As illustrated in FIG. 12, the attachment flange 24 of the spray pipe 20 protrudes from an outer circumferential surface of the pipe portion 21 and has an attachment surface (first attachment surface) 24a along the vertical direction. On the other hand, the flange 14a of the opening portion 14 protrudes from the side of the absorption tower 10 and has an attachment surface (second attachment surface) 14d along the vertical direction formed on an end thereof. The attachment surface 24a and the attachment surface 14d are attached in a state of facing each other with the gasket 14c interposed therebetween.

The attachment flange 24 of the spray pipe 20 is attached to the flange 14a of the opening portion 14 by the fastening portion (first fastening portion) 50 in a state where the gasket 14c (for example, made of butyl rubber) is interposed therebetween. As illustrated in FIG. 12, the first fastening portion 50 includes a fastening bolt 51 having a head and a shank, a washer 52 disposed between the head of the fastening bolt 51 and the attachment flange 24, and a fastening nut 53 fastened on the shank of the fastening bolt 51. In FIG. 12, the first fastening portion 50 is illustrated in only two locations above and below in the vertical direction, but the first fastening portion 50 is provided at a plurality of locations so as to surround an outer peripheral edge of the attachment flange 24.

The attachment flange 24 of the spray pipe 20 and the flange 14a of the opening portion 14 are detachably attached by fasteners including the fastening bolt 51 and the fastening nut 53. As a result, when replacing or inspecting the spray pipe 20, the fastening bolt 51 and the fastening nut 53 are unfastened, so that the spray pipe 20 can be easily removed from the absorption tower 10.

As illustrated in FIG. 3, the desulfurization device 100 of the present embodiment includes five spray pipes 20. The absorption tower 10 included in the desulfurization device 100 of the present embodiment includes five opening holes 14e respectively formed at five locations as the number of the spray pipes 20, and five flanges 14a disposed around the opening holes 14e. Five attachment flanges 24 of five spray pipes 20 are respectively attached to the five flanges 14a in a one-to-one manner. The desulfurization device 100 of the present embodiment includes five spray pipes 20, but the number of the spray pipes may be arbitrary. In this case, the absorption tower 10 is provided with the opening holes 14e and the flanges 14a disposed therearound the respective numbers of which are the same as the number of the spray pipes 20.

Here, in a case that an end face of the opening portion 14 is inclined from the vertical direction, a state is established in which the spray pipe 20 attached via the attachment flange 24 to the opening portion 14 is inclined from the horizontal direction. Therefore, a thickness of the attachment flange 24 of the lining portion 14b and an interposed portion is appropriately adjusted so that the end face of the opening portion 14 coincides with the vertical direction. A sealing material may be applied between the attachment flange 24 and the gasket 14c so that the end face of the opening portion 14 coincides with the vertical direction. Note that the application of the sealing material may be performed instead of adjusting the thickness of the lining portion 14b, or may be performed in addition to adjusting the thickness of the lining portion 14b.

As illustrated in FIG. 12, the attachment surface 14d of the opening portion 14 and the attachment surface 24a formed on the attachment flange 24 of the spray pipe 20 face each other with the gasket 14c interposed therebetween, and in this state, the spray pipe 20 are attached to the opening portion 14 of the absorption tower 10. In this state, a lower end portion 14eB of the opening hole 14e is disposed lower than the lower end portion 21d of the pipe portion 21 in the vertical direction, and an upper end portion 14eA of the opening hole 14e is disposed higher than the upper end portion 21c of the pipe portion 21. In this state, the pipe portion 21 is disposed in a state where its lower end 21d does not contact the inner peripheral surface of the opening portion 14 and the opening hole 14e.

As illustrated in FIG. 12, the spray pipe 20 is attached to the opening portion 14 such that a position in the vertical direction of the axis X1 along which the pipe portion 21 extends is lower than a center position of the opening hole 14e in the vertical central.

Figure 13:
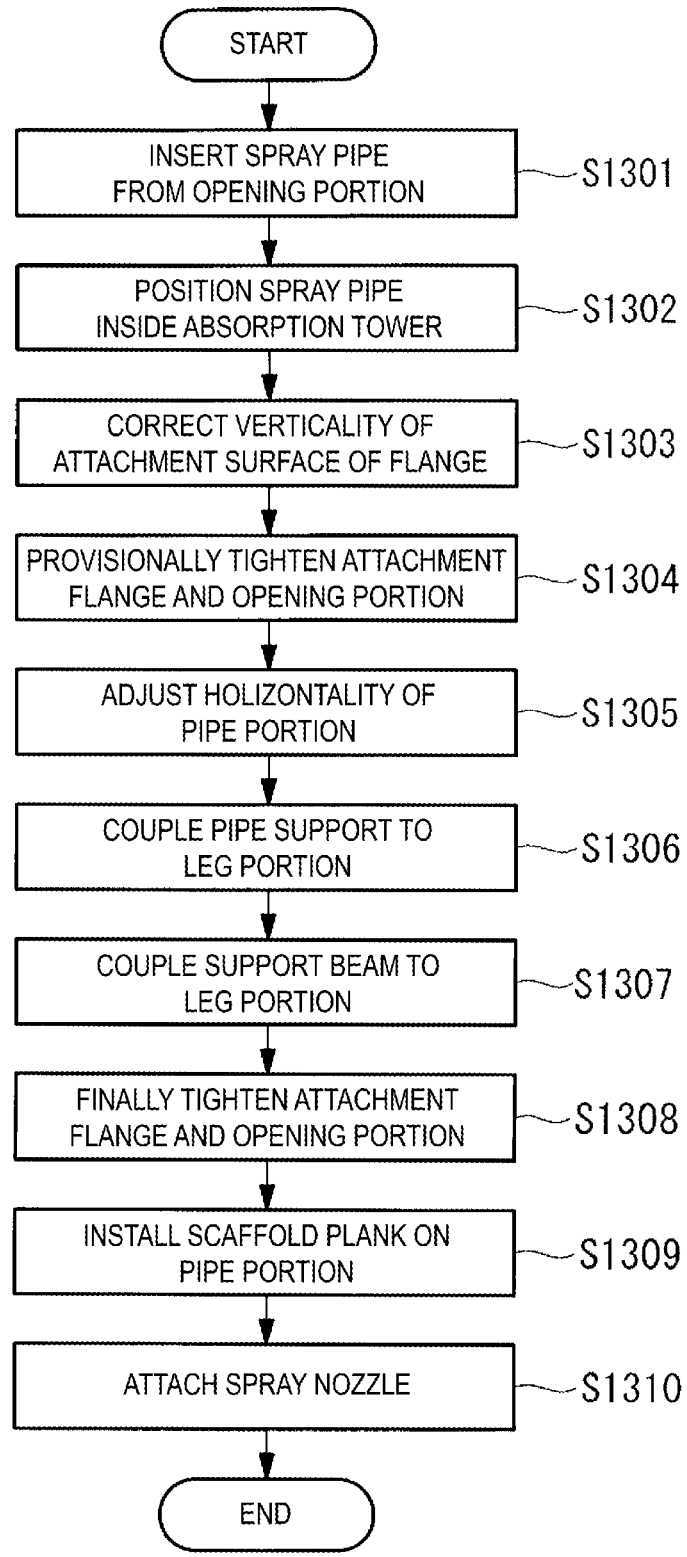
FIG. 13 is a flowchart illustrating a method for installing a spray pipe inside an absorption tower.

Next, a method for installing the spray pipe 20 inside the absorption tower 10 will be described. FIG. 13 is a flowchart illustrating the method for installing the spray pipe 20 inside the absorption tower 10. Each of the processes illustrated in FIG. 13 is a process performed by a worker or a working device such a crane operated by the worker.

Figure 14:
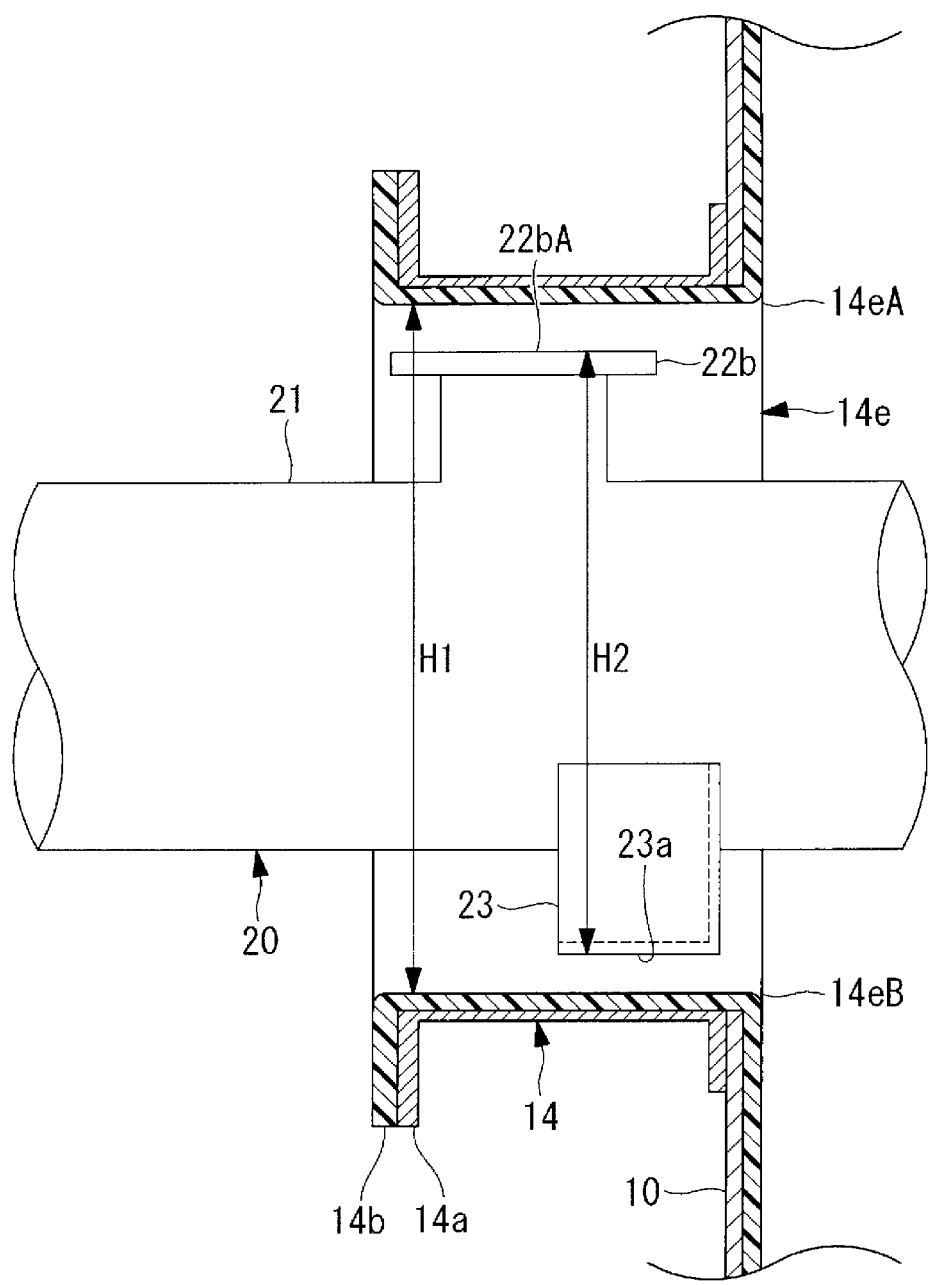
FIG. 14 is a partial enlarged view illustrating a step of inserting the spray pipe through an opening portion.

In step S1301 (insertion step), the worker lifts the spray pipe 20 placed outside the absorption tower 10 by a crane (not illustrated), and inserts the spray pipe 20 into the opening portion 14 of the absorption tower 10 in the horizontal direction. The worker adjusts a position of the pipe portion 21 with a guide rope (not illustrated) associated with the pipe portion 21 so that the spray pipe 20 does not contact the absorption tower 10. As illustrated in FIG. 14, the spray pipe 20 is inserted into the opening portion 14 of the absorption tower 10 in a state in which the spray nozzle 22a is not attached to the nozzle holder 22b.

As illustrated in FIG. 14, in the desulfurization device 100 of the present embodiment, a height H1 in the vertical direction from the lower end portion 14eB to the upper end portion 14eA of the opening hole 14e is higher than a height H2 in the vertical direction from the installation surface 23a of the leg 23 to the upper end portion 22bA of the nozzle holder 22b. This is because the spray pipe 20 is made able to be inserted into the inside of the absorption tower 10 via the opening portion 14 in a state in which the spray nozzle 22a is not attached to the nozzle holder 22b.

In step S1302 (positioning step), the worker positions the spray pipe 20 inserted into the absorption tower 10 from the opening portion 14, inside the absorption tower 10 so as to be supported by the plurality of leg portions 23. As illustrated in FIG. 2, the worker positions the spray pipe 20 such that a state is established where the installation surfaces 23a of a plurality of leg portions 23 face the supporting surface 91a of the pipe support 91, and the supporting surfaces 92a and 93a of the support beams 92 and 93, respectively.

In step S1303 (correction step), the worker corrects a verticality of the attachment surface 14d so that the attachment surface 24a of the attachment flange 24 is disposed along the vertical direction. The correction of the verticality of the attachment surface 14d is performed, for example, by adjusting the thickness of the lining portion 14b. Furthermore, the attachment surface 24a of the attachment flange 24 may disposed along the vertical direction by adjusting a thickness of a sealant agent (for example, made of silicone) that is applied between the gasket 14c and the attachment surface 24a of the attachment flange 24.

In step S1304 (provisional tightening step), the worker provisionally tightens the attachment flange 24 of the spray pipe 20 and the flange 14a of the opening portion 14 of the absorption tower 10 using the first fastening portion 50. As illustrated in FIG. 12, the attachment flange 24 and the flange 14a of the opening portion 14 are coupled by provisionally tightening the first fastening portions 50 at a plurality of locations respectively in a state in which the attachment surface 24a and the attachment surface 14d face each other with the gasket 14c interposed therebetween.

Here, "provisional tightening" refers to fastening the fastening bolt 51 and the fastening nut 53 with a torque of 30% or more and 70% or less assuming that a torque (Nm) when fastening the first fastening portion 50 in final tightening described later as 100%.

In step S1305 (adjusting step), the worker adjusts a horizontality of the pipe portion 21 so that the axis line X1 of the pipe portion 21 coincides with the horizontal direction in a state in which the attachment flange 24 and the flange 14a of the opening portion 14 are provisionally tightened. Note that the horizontal direction referred to here includes a direction at an angle within a desired tolerance range from the horizontal direction (the same applies hereinafter).

Specifically, the worker appropriately selects the thickness of the shim plate 99 inserted between the pipe support 91 and the leg portion 23, the thickness of the shim 99 inserted between the support beam 92 and the leg portion 23, and the thickness of the shim plate 99 inserted between the support beam 93 and the leg portion 23 to adjust the height of the installation surface 23a relative to the supporting surfaces 91a, 92a, and 93a. The worker, for example, puts a horizontal level device (not illustrated) on an upper surface of the nozzle holder 22b of the spray pipe 20, and visually checks the horizontal level device to determine whether or not the axis line X1 of the pipe portion 21 coincides with the horizontal direction. In a case that the worker confirms that the horizontality indicated by the horizontal level device is within the desired tolerance range, the worker ends adjusting the horizontality.

After adjusting the horizontality of the pipe portion 21 in step S1305 (adjusting step), the worker couples the pipe support 91 to the leg portion 23 disposed near the leading end 21a of the spray pipe 20 with the fastening portion 70 in step S1306 (coupling step). Specifically, the worker inserts the shaft portion of the fastening bolt 71 from below the pipe support 91 and fastens the fastening nuts 73 and 74 on the shaft portion penetrating through the leg portion 23 to couple the pipe support 91 to the leg portion 23. Note that the pipe support 91 and the leg portion 23 may be provisionally tightened in the coupling step of step S1306 so that a gap between the attachment flange 24 and the opening portion 14 can be finely adjusted in step S1308 (final tightening step) to be carried out later.

Furthermore, as described above, a clearance gap is desirably provided below the fastening nut 74 to suppress the deformation and breakage when the pipe portion 21 is thermally expanded. In a case that a clearance gap is provided below the fastening nut 74, a pair of fastening nuts 73 and 74 are tightened to be adjacent to each other so that a state is established where the pair of fastening nuts 73 and 74 are not detached. In this manner, in step S1306, even in the case that the pipe portion 21 is thermally stretched, the pipe support 91 is coupled to the leg portion 23 in a state in which the leg portions 23 attached to the pipe portion 21 are movable along the axis line X1.

In step S1307 (coupling step), the worker couples the support beams 92, 93 to the leg portions 23 with the fastening portions 80. Specifically, the worker inserts the shanks of the fastening bolts 81 from below the support beams 92, 93 and fastens the fastening nuts 83 and 84 on the shanks penetrating through the leg portions 23 to couple the support beams 92, 93 to the leg portions 23. Note that the support beams 92, 93 and the leg portions 23 may be provisionally tightened in the coupling step of step S1307 so that a gap between the attachment flange 24 and the opening portion 14 can be finely adjusted in step S1308 (final tightening step) to be carried out later.

Furthermore, as described above, a clearance gap is desirably provided below the fastening nut 84 to suppress the deformation and breakage when the pipe portion 21 is thermally expanded. In a case that a clearance gap is provided below the fastening nut 84, a pair of fastening nuts 83 and 84 are tightened to be adjacent to each other so that a state is established where the pair of fastening nuts 83 and 84 are not detached. In this manner, in step S1307, even in the case that the pipe portion 21 is thermally stretched, the support beams 92, 93 are coupled to the leg portions 23 in a state in which the leg portions 23 attached to the pipe portion 21 are movable along the axis line X1.

Here, the coupling between the support beam 92 and the leg portion 23 is performed prior to the coupling between the support beam 93 and the leg portion 23. The coupling step of step S1307 is performed in an order from the leading end 21a of the pipe portion 21 toward the base end 21b.

In step S1308 (final tightening step), the worker checks the gap between the attachment flange 24 of the spray pipe 20 and the opening portion 14 of the absorption tower 10 to confirm that there is no excessive gap. If a gap exists, the position of the spray pipe 20 is finely adjusted to eliminate the gap. After that, the attachment flange 24 and the flange 14a of the opening portion 14 are finally tightened using the first fastening portion 50. As illustrated in FIG. 12, the attachment flange 24 of the spray pipe 20 and the flange 14a of the opening portion 14 are coupled by finally tightening the first fastening portions 50 at a plurality of locations in a state in which the attachment surface 24a of the attachment flange 24 and the attachment surface 14d of the flange 14a face each other with the gasket 14c interposed therebetween. Here, "final tightening" refers to fastening the first fastening portion 50 provisionally tightened in step S1304 with an increased torque (Nm).

Note that, in step S1301 to step S1308 described above, a method for installing one spray pipe 20 is described, but a plurality of spray pipes 20 are installed by repeating steps S1301 to S1308.

In step S1309 (installing step), the worker carries a plurality of scaffold planks (foothold members) 60 from the outside of the absorption tower 10 via the manhole 15 into the absorption tower 10, and installs the scaffold planks on the upper end portions 21c of the pipe portions 21 of the spray pipes 20, as illustrated in FIG. 4. As illustrated in FIG. 3, the scaffold plank 60 is installed to be put across a plurality of spray pipes 20. The scaffold plank 60 is a member on which a worker gets to work in order to attach the spray nozzle 22a to the nozzle holder 22b of the pipe portion 21.

In step S1310 (attachment step), the worker in a state of getting on the scaffold plank 60 attaches the spray nozzle 22a to the nozzle holder 22b.

The worker attaches the spray nozzle 22a to the nozzle holder 22b concerning a plurality of nozzle holders 22b provided on a plurality of nozzle holders 20 while moving over the scaffold plank 60. Note that in a case that provisional tightening is performed in step S1306 (coupling step) or step S1307 (coupling step), the final tightening is performed in each case for coupling. An order of final tightening is the same as that of provisional tightening. After attaching the spray nozzles 22a to all of the nozzle holders 22b or after completing final tightening for the all fastening portions in the case of performing the final tightening described above, the worker carries a plurality of scaffold planks 60 via the manhole 15 out of the absorption tower 10. Then, the worker moves from the manhole 15 to the outside of the absorption tower 10, and ends processing of this flow.

The actions and effects exhibited by the desulfurization device 100 of the above-described present embodiment will now be described.

According to the desulfurization device 100 of the present embodiment, the attachment flange 24 of the spray pipe 20 disposed inside the absorption tower 10 and the flange 14a disposed around the opening hole 14e of the absorption tower 10 are detachably attached. Because the spray pipe 20 can be easily removed from the absorption tower 10 for replacement or inspection, it is possible to easily replace or inspect the spray pipe 20 in the case that a failure such as damage or clogging occurs in a portion of the spray pipe 20.

According to the desulfurization device 100 of the present embodiment, the spray pipe 20 can be attached to the opening portion 14 of the absorption tower 10 with the attachment surface 24a of the attachment flange 24 of the spray pipe 20 facing the attachment surface 14d of the flange 14a of the opening portion 14 of the absorption tower 10, using the attachment surface 14d along the vertical direction as a reference surface. Therefore, since it is possible to reduce the number of steps for adjusting an axial center direction of the pipe portion 21 of the spray pipe 20 to be in the horizontal direction, and the rotation direction angle about the axial center to be at a predetermined angle, the work of inserting the spray pipe 20 from the outside of the absorption tower 10 to install it in the inside is facilitated.

According to the desulfurization device 100 of the present embodiment, the liquid absorbent and the exhaust gas can be prevented from leaking to the outside from the opening portion 14 (opening hole 14e) of the absorption tower 10 by fastening the attachment flange 24 of the spray pipe 20 to the flange 14a of the opening portion 14 of the absorption tower 10 to attach the spray pipe 20 to the absorption tower 10.

The desulfurization device 100 of the present embodiment includes a prescribed number (five) of spray pipes 20, and the absorption tower 10 includes a prescribed number (five) of opening holes 14e and a prescribed number (five) of flanges 14a, and a prescribed number (five) of attachment flanges 24 are respectively attached to a prescribed number (five) of flanges 14a in a one-to-one manner.

With such a configuration, only the spray pipe 20, which needs to be replaced or inspected among a prescribed number of spray pipes 20, can be removed from the absorption tower 10. For this reason, the replacement and inspection of the spray pipe 20 can be easily performed as compared to a case that a plurality of the spray pipes 20 are attached to one opening hole 14e of the absorption tower 10. Since the opening holes 14e of the absorption tower 10 and the spray pipes 20 correspond in a one-to-one manner, an installation work when installing the spray pipe 20 in the absorption tower 10 can be performed easily and accurately.

In the desulfurization device 100 of the present embodiment, the position in the vertical direction of the axis X1 along which the pipe portion 21 extends is disposed lower than the center position in the vertical direction of the opening hole 14e.

With such a configuration, a sufficient space is ensured above the pipe portion 21 when the pipe portion 21 is installed at the opening hole 14e, making it possible to easily install the pipe portion 21. Additionally, the installation work can be performed while moving the pipe portion 21 downward along the gravity after inserting the pipe portion 21 into the opening hole 14e, facilitating the installation work of the pipe portion 21 and improving an installation precision.

In the desulfurization device 100 of the present embodiment, the pipe portion 21 is disposed in a state where the lower end potion does not contact the opening hole 14e.

With such a configuration, a failure caused by the contact between the pipe portion 21 and the opening hole 14e can be prevented.

In the desulfurization device 100 of the present embodiment, the spray pipe 20 includes the leg portion 23 attached to the lower portion in the vertical direction of the pipe portion 21 and having the installation surface 23a, and the position of the lower end in the vertical direction of the leg portion 23 is disposed lower than the position of the lower end in the vertical direction of the opening hole 14e.

With such a configuration, the installation work can be performed while moving the leg portion 23 downward along the gravity, the leg portion 23 being lifted upward in the opening hole 14e when being passed through the opening hole 14e of the absorption tower 10. Therefore, the installation work when installing the leg portions 23 of the spray pipe 20 on the pipe support 91 and the support beams 92, 93 provided in the absorption tower 10 can be easily and accurately performed.

In the desulfurization device 100 of the present embodiment, the lower end portion 14eB of the opening hole 14e is disposed lower than the lower end portion 21d of the pipe portion 21 in the vertical direction, and the upper end portion 14eA of the opening hole 14e is disposed higher than the upper end portion 21c of the pipe portion 21. Therefore, the pipe portion 21 is inserted into the inside from the outside of the absorption tower 10 from the opening hole 14e of the opening portion 14 along the horizontal direction, and thereafter the pipe portion 21 is installed inside the absorption tower 10 in a state where the position in the vertical direction is maintained between the upper end portion 14eA and the lower end portion 14eB of the opening hole 14e. For this reason, a moving amount of the spray pipe 20 in the vertical direction from the insertion until the installation into the inside of the absorption tower 10 is smaller. Therefore, when the spray pipe 20 is inserted from the outside of the absorption tower 10 and installed into the inside, the horizontality of the spray pipe 20 can be accurately maintained.

The clearance is ensured between the upper end portion 21c of the pipe portion 21 and the upper end portion 14eA of the opening hole 14e, and the clearance is ensured between the lower end portion 21d of the pipe portion 21 and the lower end portion 14eB of the opening hole 14e. Therefore, when the spray pipe 20 is inserted from the outside of the absorption tower 10, the pipe portion 21 can be somewhat permitted to move in the vertical direction.

In the desulfurization device 100 of the present embodiment, when the spray pipe 20 is inserted into the absorption tower 10 in a state in which the spray nozzle 22a is not attached to each of a plurality of nozzle holders 22b, the height of the spray pipe 20 in the vertical direction is the height H2 from the installation surface 23a of the leg portion 23 to the upper end portion 22bA of the nozzle holder 22b. Then, the height H1 from the lower end portion 14eB to the upper end portion 14eA of the opening hole 14e is higher than the height H2 of the spray pipe 20 in the vertical direction. For this reason, the spray pipe 20 having the leg portions 23 can be inserted from the outside to the inside of the absorption tower 10 through the opening hole 14e. The spray nozzle 22a is attached to each of a plurality of nozzle holders 22b after the spray pipe 20 is inserted into the inside of the absorption tower 10, and then, the spray pipe 20 is put into a state capable of injecting the liquid absorbent.

As illustrated in FIG. 17, in one embodiment, the opening portion 14 formed on the side surface of the absorption tower 10 includes a rectangular opening hole 14e and a rectangular flange 14a around the opening hole 14e. When the opening hole 14e is rectangular, the position of the spray pipe 20 can be changed and adjusted in a wide range in both the vertical direction and the horizontal direction, making it easy to install the spray pipe 20. The shapes of the attachment flange 24 and the flange 14a may be rectangular. When the attachment flange 24 and the flange 14a are also rectangular in shape, the fastening portion for fastening the attachment flange 24 and the flange 14a can be efficiently disposed around the opening hole 14e. Here, a rectangle includes not only a shape in which four corners are orthogonal but also a shape in which corners are partially rounded.

Other Embodiments

In the description above, as illustrated in FIG. 2, when the opening portion 14 is viewed from the side of the absorption tower 10, the flange 14a and the attachment flange 24 have a rectangular shape with corner portions in two lateral locations on the upper side in the vertical direction and two lateral locations on the lower side in the vertical direction. However, other aspects are possible. For example, the flange 14a and the attachment flange 24 may have the shape illustrated in FIG. 15.

Figure 15:
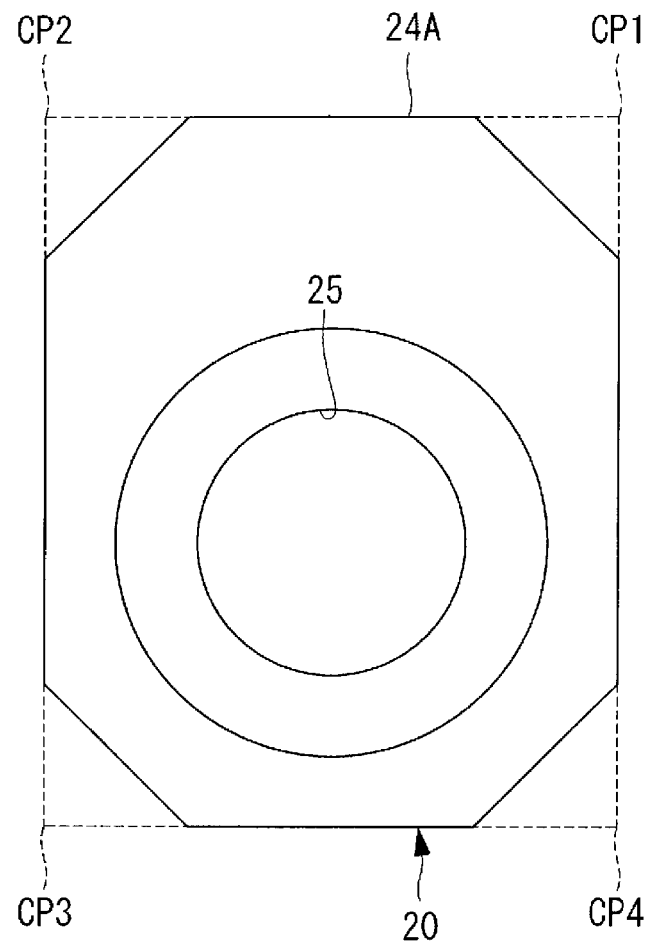
FIG. 15 is a diagram illustrating a desulfurization device viewed from a side of the absorption tower.

FIG. 15 is a diagram illustrating a desulfurization device viewed from the side of the absorption tower 10. As illustrated in FIG. 15, in an attachment flange 24A in an modification example, when the opening portion 14 is viewed from the side of the absorption tower 10, the flange 14a and the attachment flange 24A may have a shape in which four corner portions CP1, CP2, CP3, and CP4 are cut out where horizontal lines passing through upper and lower ends in the vertical direction intersect with vertical lines passing through left and right ends in the horizontal direction. Note that, although the flange 14a is not illustrated in FIG. 15, the flange 14a has the same shape as the attachment flange 24A.

With such a configuration, as compared to a case that four corner portions CP1, CP2, CP3, and CP4 are not cut out, the working space of the worker is sufficiently ensured. For example, the worker can work putting his/her hand on the back side of the flange from the cutout portion, or the like, making it easy to install the spray pipe 20. Note that the flange 14a and the attachment flange 24A may have other shapes as long as the corners CP1, CP2, CP3, and CP4 are cut out. For example, instead of the octagonal shape illustrated in FIG. 15, each corner may have a shape that is rounded in a circle. The flange 14a and the attachment flange 24A may be formed into an elliptical shape.

Figure 16:
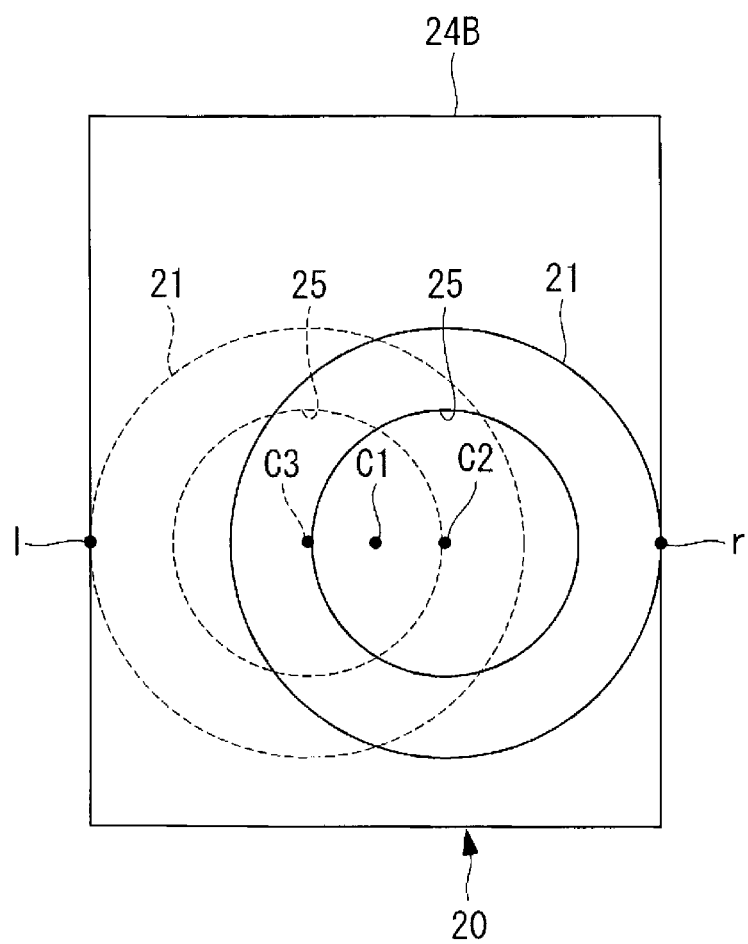
FIG. 16 is a diagram illustrating a desulfurization device viewed from a side of the absorption tower.

In the description above, as illustrated in FIG. 2, when the opening portion 14 is viewed from the side of the absorption tower 10, the center position of the left end and the right end of the attachment flange 24 coincides in the horizontal direction with the center position of the pipe portion 21, but other aspects are possible. For example, as illustrated in FIG. 16, when the opening portion 14 is viewed from the side of the absorption tower 10, a center position C1 of a left end 1 and a right end r of an attachment flange 24B may be separate in the horizontal direction from a center position C2 of the pipe portion 21. By disposing the pipe portion 21 at a position indicated by solid lines in FIG. 16, the pipe portion 21 can be installed even in a case that an obstacle is disposed to the left of the pipe portion 21.

As illustrated by broken lines in FIG. 16, when the opening portion 14 is viewed from the side of the absorption tower 10, the center position C1 of the left end 1 and the right end r of the attachment flange 24B may be separate in the horizontal direction from a center position C3 of the pipe portion 21. By disposing the pipe portion 21 at a position indicated by the broken lines in FIG. 16, the pipe portion 21 can be installed even in a case that an obstacle is disposed to the right of the pipe portion 21.

In the above description, the desulfurization device 100 is a device using the lime-gypsum method in which the liquid absorbent containing lime is brought into gas-liquid contact with the exhaust gas to remove sulfur oxide contained in the exhaust gas, but may be another aspect. For example, the desulfurization device may be that using a seawater desulfurization method in which seawater containing an alkali component is used as the liquid absorbent.

In the description above, the spray pipe 20 is disposed inside the absorption tower 10 in the horizontal direction, but the spray pipe 20 may be disposed inclined at an angle from the horizontal direction.

In the description above, the attachment flange 24 of the spray pipe 20 is attached to the flange 14a of the opening portion 14 of the absorption tower 10, but other aspects are possible. For example, in a case that the flange 14a is not provided to the opening portion 14 of the absorption tower 10, a fastener may be used to directly attach the attachment flange 24 to the side wall of the absorption tower 10. In this case, a portion of the side wall of the absorption tower 10 that surrounds the opening hole is a flange portion to which the attachment flange 24 of the spray pipe 20 is attached.

REFERENCE SIGNS LIST

10 Absorption tower
14 Opening portion
14a Flange (second flange portion)
14b Lining portion
14d Attachment surface (second attachment surface)
14e Opening hole
14eA Upper end portion
14eB Lower end portion
20 Spray pipe
21 Pipe portion
21a Leading end
21b Base end
21c Upper end portion
21d Lower end portion
22 Nozzle portion
22a Spray nozzle
22b Nozzle holder
22bA Upper end portion
23 Leg portion
23a Installation surface (first surface)
23b Insertion hole
24, 24A, 24B Attachment flange (first flange portion)
24a Attachment surface (first attachment surface)
25 Supply port
60 Scaffold plank (foothold member)
91 Pipe support (supporting portion)
91a Supporting surface (second surface)
92, 93 Support beam (supporting portion)
92a, 93a Supporting surface (second surface)
99 Shim plate (plate-shaped member)
99a Cutout
100 Desulfurization device
CL Clearance
X1, X2 Axis line

The invention claimed is:

1. A desulfurization device comprising:
an absorption tower serving as a passage for exhaust gas; and
a spray pipe disposed inside the absorption tower, wherein
the spray pipe includes
a cylindrical pipe portion having a leading end closed,
a first flange portion attached to the pipe portion, and
a leg portion attached to a lower portion of the pipe portion in the vertical direction,
the absorption tower includes
an opening hole opening laterally,
a second flange portion disposed around the opening hole, and
a supporting portion configured to support the leg portion of the spray pipe,
the first flange portion and the second flange portion are detachably attached.

2. The desulfurization device according to claim 1, comprising:
a prescribed number of the spray pipes, wherein
the absorption tower includes
a prescribed number of the opening holes, and
a prescribed number of the second flange portions, and
a prescribed number of the first flange portions are respectively attached to the prescribed number of the second flange portions in a one-to-one manner.

3. The desulfurization device according to claim 1, wherein
an axis line of the pipe portion extends along a horizontal direction, and a position of the axis in a vertical direction is disposed lower than a center position of the opening hole in the vertical direction.

4. The desulfurization device according to claim 1, wherein
the pipe portion is disposed in a state where a lower end portion of the pipe portion does not contact the opening hole.

5. The desulfurization device according to claim 1, wherein
the first and second flange portions are generally rectangular in shape with the corners cut off.

6. The desulfurization device according to claim 1, wherein
the center position of the pipe when looking from the end of the pipe is offset from the center of the hole.

7. The desulfurization device according to claim 1, wherein
the opening hole is rectangular.

8. The desulfurization device according to claim 7, wherein
the first flange portion and the second flange portion are rectangular in shape.

9. A desulfurization device comprising:
an absorption tower serving as a passage for exhaust gas; and
a spray pipe disposed inside the absorption tower, wherein the spray pipe includes
a cylindrical pipe portion having a leading end closed,
a first flange portion attached to the pipe portion, and
a leg portion attached to a lower portion of the pipe portion in the vertical direction,
the absorption tower includes
an opening hole opening laterally, and
a second flange portion disposed around the opening hole, and
the first flange portion and the second flange portion are detachably attached,
wherein an axis line of the pipe portion extends along a horizontal direction, and a position of the axis in a vertical direction is disposed lower than a center position of the opening hole in the vertical direction, and
a position of a lower end of the leg portion in the vertical direction is disposed lower than a position of a lower end of the opening hole in the vertical direction.

10. A desulfurization device according to claim 1, comprising:
an absorption tower serving as a passage for exhaust gas; and
a spray pipe disposed inside the absorption tower, wherein the spray pipe includes
a cylindrical pipe portion having a leading end closed, and
a first flange portion attached to the pipe portion,
the absorption tower includes
an opening hole opening laterally, and
a second flange portion disposed around the opening hole, and
the first flange portion and the second flange portion are detachably attached,
wherein the spray pipe includes
a leg portion attached to a lower portion of the pipe portion in the vertical direction and having a first surface,
a plurality of nozzle holders disposed at a plurality of locations on an upper portion of the pipe portion in the vertical direction, and guiding a liquid absorbent upward in the vertical direction, the liquid absorbent flowing through the pipe portion in the horizontal direction, and
a spray nozzle detachably attached to each of the plurality of nozzle holders and injecting the liquid absorbent upward in the vertical direction,
the desulfurization device comprises a supporting portion installed in the absorption tower to support the spray pipe and having a second surface,
the spray pipe is supported in a state where the first surface faces the second surface, and
a height from a lower end portion to an upper end portion of the opening hole is higher than a height from the first surface of the leg portion to an upper end portion of the nozzle holder, in the vertical direction.

* * * * *